US012518142B2

(12) United States Patent
Yan et al.

(10) Patent No.: US 12,518,142 B2
(45) Date of Patent: Jan. 6, 2026

(54) METHOD AND SYSTEM FOR DUAL-SPARSE CONVOLUTION PROCESSING AND PARALLELIZATION

(71) Applicant: MOFFETT INTERNATIONAL CO., LIMITED, Hong Kong (HK)

(72) Inventors: Enxu Yan, Los Altos, CA (US); Yong Lu, Los Altos, CA (US); Wei Wang, Los Altos, CA (US); Zhibin Xiao, Los Altos, CA (US); Jiachao Liu, Los Altos, CA (US); Hengchang Xiong, Shenzhen (CN)

(73) Assignee: Moffett International Co., Limited, Hong Kong (HK)

( * ) Notice: Subject to any disclaimer, the term of this patent is extended or adjusted under 35 U.S.C. 154(b) by 600 days.

(21) Appl. No.: 18/079,197

(22) Filed: Dec. 12, 2022

(65) Prior Publication Data
US 2023/0111362 A1    Apr. 13, 2023

Related U.S. Application Data

(63) Continuation of application No. PCT/CN2020/095760, filed on Jun. 12, 2020.

(51) Int. Cl.
*G06F 9/30* (2018.01)
*G06F 9/38* (2018.01)
*G06N 3/0464* (2023.01)

(52) U.S. Cl.
CPC ....... *G06N 3/0464* (2023.01); *G06F 9/30036* (2013.01); *G06F 9/3877* (2013.01)

(58) Field of Classification Search
CPC .. G06N 3/0464; G06F 9/30036; G06F 9/3877
See application file for complete search history.

(56) References Cited

U.S. PATENT DOCUMENTS 7,707,091 B1 *  4/2010  Kauffman ............. G06Q 30/02
                                                        705/36 R
10,838,724 B2   11/2020  Woo et al.
(Continued)

FOREIGN PATENT DOCUMENTS

CN    104077233 A    10/2014
CN    107239824 A    10/2017
(Continued)

OTHER PUBLICATIONS

Elsen et al., "Fast Sparse ConvNets", arVix 1911.09723, Nov. 2019, 12 pages.
(Continued)

*Primary Examiner* — Eliyah S. Harper
(74) *Attorney, Agent, or Firm* — Sheppard Mullin Richter & Hampton LLP

(57) ABSTRACT

Methods, systems, and apparatus, including computer programs encoded on computer storage media, for parallelizing convolution processing. An exemplary method comprises: segmenting an input tensor into a plurality of sub-tensors and a plurality of filters into a plurality of sub-filter groups; respectively assigning a plurality of combinations of the sub-tensors and the sub-filter groups to a plurality of processors; storing, by each of the plurality of processors, non-zero values of the sub-tensor and the sub-filter group in the assigned combination as index-value pairs; parallelly performing for a plurality of iterations, by the plurality of processors, multiply-and-accumulate (MAC) operations based on the index-value pairs to obtain a plurality of outputs, where the index-value pairs of the sub-filter groups are rotated among the plurality of processors across the plurality of iterations; and aggregating the plurality of outputs as an output tensor.

20 Claims, 13 Drawing Sheets

(56) References Cited

U.S. PATENT DOCUMENTS

| | | | |
|---|---|---|---|
| 11,069,082 B1* | 7/2021 | Ebrahimi Afrouzi | H04N 23/56 |
| 11,113,601 B1* | 9/2021 | Xiao | G06N 3/082 |
| 11,153,503 B1* | 10/2021 | Ebrahimi Afrouzi | H04N 7/183 |
| 11,274,929 B1* | 3/2022 | Afrouzi | G06T 7/30 |
| 2014/0310243 A1* | 10/2014 | McGee | G06F 16/27 |
| | | | 707/639 |
| 2015/0371359 A1 | 12/2015 | Wu et al. | |
| 2017/0235848 A1* | 8/2017 | Van Dusen | G06Q 30/0201 |
| | | | 705/12 |
| 2019/0250915 A1* | 8/2019 | Yadavalli | G06F 9/34 |
| 2019/0251433 A1 | 8/2019 | Lin et al. | |
| 2020/0160181 A1 | 5/2020 | Zlateski et al. | |
| 2020/0410337 A1* | 12/2020 | Huang | G06N 3/04 |
| 2021/0352107 A1* | 11/2021 | Monni | H04L 63/20 |
| 2021/0357555 A1* | 11/2021 | Liu | G06F 30/20 |
| 2022/0327637 A1* | 10/2022 | Shah | G06Q 50/01 |
| 2023/0111362 A1* | 4/2023 | Yan | G06N 3/045 |
| | | | 706/15 |
| 2023/0196061 A1 | 6/2023 | David et al. | |
| 2023/0259758 A1* | 8/2023 | Zhang | G06N 3/0464 |
| | | | 706/25 |
| 2024/0119050 A1* | 4/2024 | Interlandi | G06F 16/24537 |

FOREIGN PATENT DOCUMENTS

| | | |
|---|---|---|
| CN | 108510066 A | 9/2018 |
| CN | 108805266 A | 11/2018 |
| CN | 109993297 A | 7/2019 |
| CN | 110135553 A | 8/2019 |
| CN | 110276450 A | 9/2019 |
| CN | 110457069 A | 11/2019 |
| CN | 111160517 A | 5/2020 |
| CN | 111247537 A | 6/2020 |
| EP | 3385901 A1 | 10/2018 |
| GB | 2568102 A | 5/2019 |
| WO | 2019/144865 A1 | 8/2019 |

OTHER PUBLICATIONS

Gale et al., "The State of Sparsity in Deep Neural Networks", arVix 1902.09574, Feb. 2019, 15 pages.

Jaiswal, A. "Extreme Classification", Thesis Submission for Department of Computer Science & Engineering, Indian Institute of Technology, Bombay, Jun. 2018, 54 pages.

Parashar et al., "SCNN: An Accelerator for Compressed-sparse Convolution Neural Networks", arVix 1708.04485, May 2017, 12 pages.

Park et al., "Faster CNNs with Direct Sparse Convolutions and Guided Pruning", International Conference on Learning Representation 2017, 12 pages.

Yen et al., "PPDSparse: A Parallel Primal-Dual Sparse Method for Extreme Classification", KDD, Aug. 2017, Halifax, Canada, Research Paper, p. 545-553.

Yu et al., "Temporal Structure Mining for Weakly Supervised Action Detection", IEEE/CVF International Conference on Computer Vision, Nov. 2019, p. 4321-4330.

PCT International Search Report and the Written Opinion mailed Mar. 17, 2021, issued in related International Application No. PCT/CN2020/095760 (9 pages).

Notification to Grant Patent Right for Invention dated May 31, 2024, issued in related Chinese Patent Application No. 202080101977.6, with English machine translation (5 pages).

PCT International Preliminary Report on Patentability mailed Dec. 22, 2022, issued in related International Application No. PCT/CN2020/095760 (5 pages).

First Office Action and Search Report dated Mar. 21, 2024, issued in related Chinese Application No. 202080101977.6, with English machine translation (11 pages).

Bengong Yu et al., "Question Classification Based on Bidirectional GRU with Hierarchical Attention and Multi-Channel Convolution", Data Analysis and Knowledge Discovery, 4(8), 2020, pp. 50-62, with English language abstract.

* cited by examiner

METHOD AND SYSTEM FOR DUAL-SPARSE CONVOLUTION PROCESSING AND PARALLELIZATION

CROSS REFERENCE TO RELATED APPLICATIONS

This application is a continuation application of International Patent Application No. PCT/CN2020/095760, filed on Jun. 12, 2020, which is incorporated herein by reference in its entirety.

TECHNICAL FIELD

The disclosure relates generally to artificial intelligence, more particularly to parallelizing convolution processing by exploiting the sparseness in input activation tensors and filter tensors.

BACKGROUND

Neural networks (NN) are currently the foundation for many modern artificial intelligence (AI) applications such as image and video recognition, recommender systems, classification, medical image analysis, and natural language processing. NNs are employed in various usage scenarios from self-driving cars, detecting cancer, to playing complex games. A typical NN may comprise a series of convolution layers where expensive convolution operations are performed (the cost comprises both computational cost and energy cost). In recent years, various technologies have been developed to improve the computational and energy efficiency of NNs, such as reducing the number of non-zero parameters (connections between neurons) in the NN filters, trimming parts of the network (e.g., channels of neurons or columns/rows of filters). A common theme shared by these technologies is to introduce sparseness to the convolution processing in NNs, which offers great potential to improve inference throughput and reduce latency. However, existing hardware architectures generally rely on general-purpose compute engines (e.g., GPUs), which are not optimized for sparse convolution. These architectures are unable to efficiently store sparse tensors or fully exploit higher levels of parallelism at large scale. This problem becomes even more acute in dual-sparse convolution scenarios (both input tensors and filters are sparse). Accordingly, it is desirable to build a novel system architecture that empowers more efficient sparse convolution.

SUMMARY

Various embodiments of the present specification may include systems, methods, and non-transitory computer-readable media for dual-sparse convolution processing and parallelization.

According to one aspect, the method for parallelizing convolution processing is provided. The method comprises: obtaining an input tensor and a plurality of filters sharing a plurality of channels with the input tensor; dividing the plurality of channels into a plurality of channel groups; segmenting the input tensor into a plurality of sub-tensors and the plurality of filters into a plurality of sub-filter groups according to the plurality of channel groups; respectively assigning a plurality of combinations of the sub-tensors and the sub-filter groups to a plurality of processors, wherein each of the plurality of combinations comprises a sub-tensor and a sub-filter group corresponding to the same channel group; storing, by each of the plurality of processors, one or more non-zero values of the sub-tensor in the assigned combination in one or more first index-value pairs, and one or more non-zero values of the sub-filter group in the assigned combination in one or more second index-value pairs; parallelly performing, by the plurality of processors, multiply-and-accumulate (MAC) operations based on the first index-value pairs and the second index-value pairs to obtain a plurality of outputs; and aggregating the plurality of outputs as an output tensor.

In some embodiments, the segmenting the plurality of filters into a plurality of sub-filter groups comprises: grouping the plurality of filters into a plurality of filter groups; segmenting each of the plurality of filters into a plurality of sub-filters according to the plurality of channel groups; and determining the sub-filters of a same filter group and of a same channel group as a sub-filter group.

In some embodiments, each of the plurality of channel groups comprises one or more of the plurality of sub-tensors, and each of the plurality of sub-tensors is associated with an identifier identifying a position of the sub-tensor within the channel group in which the sub-tensor is located, and the method further comprises: storing sub-tensors associated with the same identifier from the plurality of channel groups into an input cache, wherein the input cache is shared by one or more of the plurality of processors.

In some embodiments, zero values of the sub-tensor and the sub-filter group in the assigned combination are not stored.

In some embodiments, the storing one or more non-zero values of the sub-tensor in the assigned combination as one or more first index-value pairs comprises: identifying one or more non-zero input values in the sub-tensor; for each of the one or more non-zero input values: determining a channel identifier corresponding to a channel that the non-zero input value is located in; and storing the channel identifier and the non-zero input value as a first index-value pair.

In some embodiments, the storing one or more non-zero values of the sub-filter group in the assigned combination as one or more second index-value pairs comprises: identifying one or more non-zero weights in the sub-filter group; for each of the one or more non-zero weights: determining a channel identifier corresponding to a channel that the non-zero weight is located in; and storing the channel identifier and the non-zero weight as a second index-value pair.

In some embodiments, the storing one or more non-zero values of the sub-filter group in the assigned combination as one or more second index-value pairs comprises: identifying one or more non-zero weights in the sub-filter group; for each of the one or more non-zero weights: determining a channel identifier corresponding to a channel that the non-zero weight is located in; determining a kernel identifier corresponding to a kernel that the non-zero weight belongs to; and storing a pointer in a weight buffer header indexed by the channel identifier, the pointer pointing to a second index-value pair stored in a weight buffer array, wherein the second index-value pair comprises the non-zero weight and is indexed by the kernel identifier.

In some embodiments, the respectively assigning a plurality of combinations of the sub-tensors and the sub-filter groups with a plurality of processors comprises: conducting one or more iterations of a parallel process, each iteration comprising: determining a plurality of combinations of the sub-tensors and the sub-filter groups, wherein the plurality of combinations respectively correspond to the plurality of channel groups; and respectively feeding the plurality of combinations into a plurality of processors to generate a plurality of dot products.

In some embodiments, the plurality of channel groups comprise M channel groups, and the respectively feeding the plurality of combinations into the plurality of processors further comprises: during a first iteration of the one or more iterations, determining a first set of M combinations comprising an $i_{th}$, combination of a sub-tensor and a sub-filter group from an $i_{th}$, of the M channel groups, wherein $1<=i<=M$; and during a second iteration of the one or more iterations, determining a second set of M combinations comprising: the $i_{th}$, combination of a sub-tensor and a sub-filter group from an $(i+1)_{th}$, of the M channel groups, wherein $1<=i<M$, and an $M_{th}$, combination of a sub-tensor and a sub-filter group from a 1st of the M channel groups.

In some embodiments, each processor of the plurality of processors generates one partial sum during each of the one or more iterations, and the aggregating the plurality of outputs as an output tensor comprises: for each processor of the plurality of processors, accumulating the partial sums generated by the processor across the one or more iterations to generate a dot product; and assembling the dot products generated by the plurality of processors across the one or more iterations as an output tensor.

In some embodiments, the parallelly performing MAC operations on the plurality of combinations by the plurality of processors to obtain a plurality of outputs comprises, for each of the plurality of processors: obtaining a first index-value representation of a first non-zero value in the sub-tensor associated with the processor, wherein the first index-value representation comprises a first index corresponding to a first channel in which the first non-zero value is located; obtaining, based on the first index, a second index-value representation of a second non-zero value that is located in the first channel and is in a sub-filter of the sub-filter group associated with the processor, wherein the second index-value representation comprises a second index corresponding to a filter in which the sub-filter is located; performing MAC operations on the value of the first index-value representation and the value of the second index-value representation to obtain an output; and adding the output to a partial sum identified by the second index of the second index-value representation.

In some embodiments, each of the plurality of channel groups comprises a same number of channels; and each of the plurality of sub-filter groups comprises a same number of sub-filters.

In some embodiments, each of the sub-tensors and each of the sub-filters comprise the same number of channels.

According to another aspect, a system for parallelizing convolution processing, comprises one or more processors and one or more non-transitory computer-readable memories coupled to the one or more processors and configured with instructions executable by the one or more processors to cause the system to perform operations comprising: obtaining an input tensor and a plurality of filters sharing a plurality of channels with the input tensor; dividing the plurality of channels into a plurality of channel groups; segmenting the input tensor into a plurality of sub-tensors and the plurality of filters into a plurality of sub-filter groups according to the plurality of channel groups; respectively assigning a plurality of combinations of the sub-tensors and the sub-filter groups to a plurality of processors, wherein each of the plurality of combinations comprises a sub-tensor and a sub-filter group corresponding to the same channel group; storing, by each of the plurality of processors, one or more non-zero values of the sub-tensor in the assigned combination in one or more first index-value pairs, and one or more non-zero values of the sub-filter group in the assigned combination in one or more second index-value pairs; parallelly performing, by the plurality of processors, multiply-and-accumulate (MAC) operations based on the first index-value pairs and the second index-value pairs to obtain a plurality of outputs; and aggregating the plurality of outputs as an output tensor.

According to yet another aspect, a non-transitory computer-readable storage medium for parallelizing convolution processing is configured with instructions executable by one or more processors to cause the one or more processors to perform operations comprising: obtaining an input tensor and a plurality of filters sharing a plurality of channels with the input tensor; dividing the plurality of channels into a plurality of channel groups; segmenting the input tensor into a plurality of sub-tensors and the plurality of filters into a plurality of sub-filter groups according to the plurality of channel groups; respectively assigning a plurality of combinations of the sub-tensors and the sub-filter groups to a plurality of processors, wherein each of the plurality of combinations comprises a sub-tensor and a sub-filter group corresponding to the same channel group; storing, by each of the plurality of processors, one or more non-zero values of the sub-tensor in the assigned combination in one or more first index-value pairs, and one or more non-zero values of the sub-filter group in the assigned combination in one or more second index-value pairs; parallelly performing, by the plurality of processors, multiply-and-accumulate (MAC) operations based on the first index-value pairs and the second index-value pairs to obtain a plurality of outputs; and aggregating the plurality of outputs as an output tensor These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Figure 1:
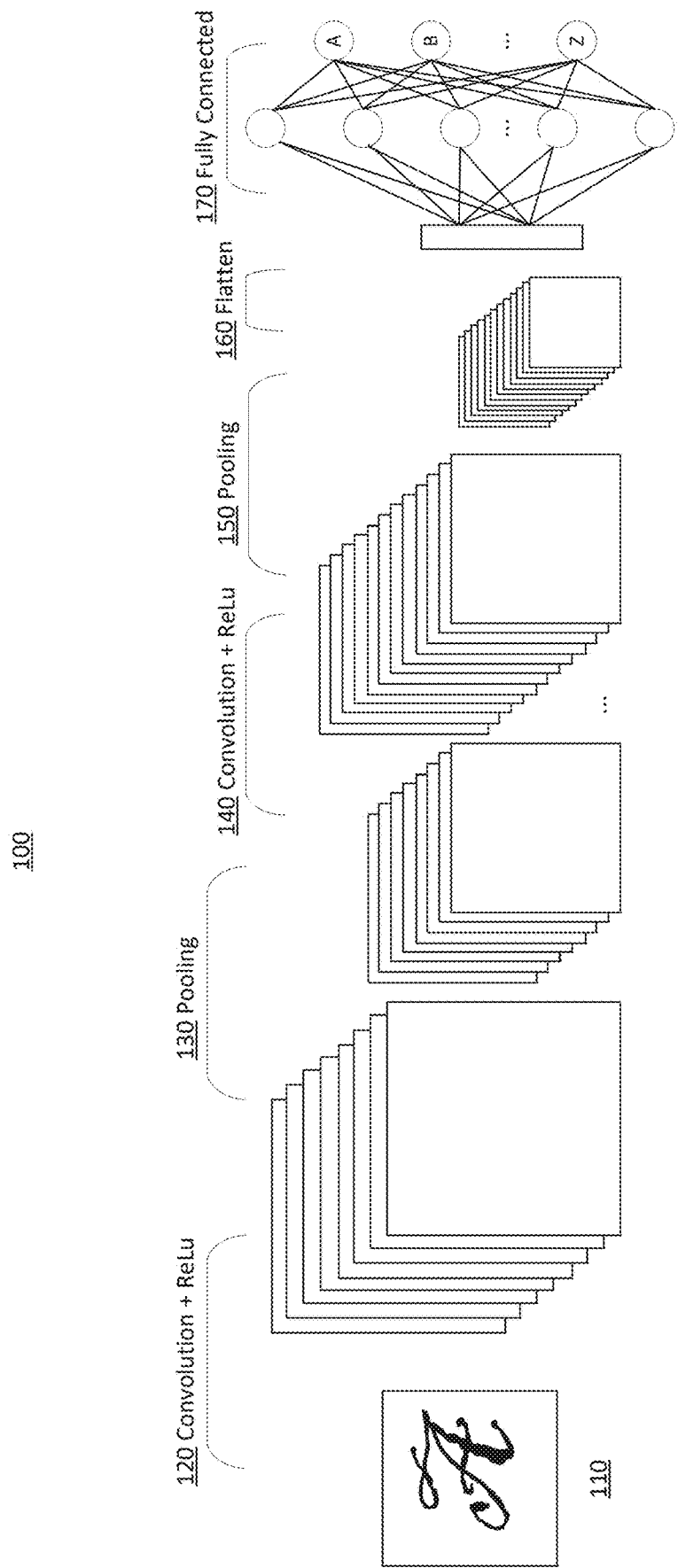
FIG. 1 illustrates an exemplary convolutional neural network (CNN) in accordance with various embodiments.

Embodiments described herein provide methods, systems, apparatus for parallelizing dual-sparse convolution processing in neural networks. A convolution operation may refer to a fundamental but computationally expensive operation to extract features of input data from a previous layer, such as a feature map derived from an image or an audio wave, or activations output from a previous layer in a neural network. The input data to a convolution operation may be referred to as an input tensor, and the output of the convolution operation may be referred to as an output tensor. The input tensor may comprise multiple channels of feature maps. For example, an RGB image may be represented as an input tensor with three channels (red channel, green channel, and blue channel), with each channel comprising a feature map (e.g., a grayscale image of the same size as the original RGB image but made of just one of the red, green, or blue colors). To extract features from an input tensor, one or more feature extractors (also called filters) may be applied to the input tensor in a convolving (e.g., sliding or moving) manner. Multiplication and accumulation (MAC) operations between the feature detectors (filters) and the input tensor may be performed during each convolving step. The outputs generated from the convolving steps may be subsequently assembled to form an output tensor of the convolution operation. The output tensor may become the input tensor of the next layer in the neural network.

During a convolution operation, one or both of the input tensor and the filter may be pruned or sparsified by introducing a large number of zeros in order to reduce the computation cost and improve inferencing speed. For example, more than 20% or 50% of the values in the input tensor and/or the filter may be set to zeros. The sparsification may lead to dual-sparse convolutions where both the input tensor and filter are sparsified, which may further amplify the ineffectiveness of existing system architectures in handling sparse convolutions. Some embodiments in this specification take advantage of the sparseness by efficiently storing the sparsified input tensors and filters in memory and parallelizing the convolution processing on a plurality of processing entities (PE) (e.g., processors).

In some embodiments, the input tensor and the filters are first segmented into sub-tensors and sub-filter groups, and each of the plurality of PEs may be assigned with a pair of a sub-tensor and a sub-filter group to perform a local MAC operation. The assignment guarantees that the pairs of sub-tensor and sub-filter group assigned to different PEs are independent from each other so that the plurality of PEs may execute the local MAC operations in parallel to boost performance. This segmentation and parallel processing scheme is also highly scalable. In some embodiments, each round of the parallel processing may generate a plurality of partial sums, and the plurality of PEs may perform the parallel processing for multiple rounds to accumulate the partial sums generated in each round and assemble the accumulated results as the output tensor. Here, the partial sums generated by each PE across the multiple rounds may be directly accumulated (within each PE) to generate a portion of the output tensor without the need to exchange data with other PEs.

In some embodiments, the assignment adopts a weight-rotating mechanism that rotates the sub-filter group assignments among the PEs during each round of parallel processing. Here, the "weight" refers to the data stored in each sub-filter group. The benefit provided by this mechanism is at least threefold: avoiding storing a same sub-filter group for each PE simultaneously (e.g., avoiding copying the same data multiple times); parallelizing and reducing the number of expensive memory reads from a higher-level memory (usually larger in capacity but slower in speed) to obtain weights from a global buffer shared by all PEs; and allowing to utilizing faster directly-connected channels among neighboring PEs to perform the rotation of the sub-filter groups between every two rounds of parallel processing.

In some embodiments, each PE may store the assigned sub-tensor and sub-filter group in energy-efficient and memory-efficient representations by only storing the non-zero values in index-value pairs within each PE. These representations may significantly reduce the storage footprint of the neural network and make the solution suitable for devices with limited memory resources. For example, the embodiments disclosed herein may be applied to edge devices in edge computing systems.

In some embodiments, the index-value pairs for the non-zero input values (in the sub-tensor) may be indexed by channel identifiers of the channels that the non-zero input values are located in, and the index-value pairs for the non-zero weights (in the sub-filter group) may be indexed by (1) the channel identifiers of the channels that the non-zero weights are located in, and/or (2) the kernel identifiers of the kernels that the non-zero weights belong to. This way, each PE may iterate through each of the non-zero input values, efficiently identify and sequentially read the corresponding non-zero weights to perform convolution operations. With the disclosed approaches herein, the performance improvement for a convolution process may be proportional to the sparseness of the involved input tensors and filters. Higher sparseness may lead to a smaller memory footprint and less MAC operations.

In the following description, specific, non-limiting embodiments of the present invention will be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

FIG. 1 illustrates an exemplary convolutional neural network (CNN) in accordance with various embodiments. CNN is widely used in a variety of applications including image understanding, speech recognition, gameplay, robotics, and may employ a deep hierarchy of layers including convolutional layers, where convolution operations occur. It may be noted that CNN is only used for illustrative purposes, the embodiments disclosed herein may be applied to other neural networks that involve convolution operations.

The example neural network 100 illustrated in FIG. 1 comprises a plurality of layers such as a first convolution layer 120 and a first ReLU (Rectified Linear Unit) layer, a first pooling layer 130, a second convolution layer 140 and a second ReLU layer, a second pooling layer 150, a flattening layer 160, and a fully connected (FC) layer 170. This example neural network 100 may be trained to match an alphabet in a given image with a plurality of known alphabet classes. As shown in FIG. 1, an image 110 with a letter is fed into the neural network 100 and transformed through the plurality of layers. The last layer (the FC layer 170) eventually generates a plurality of scores representing the similarity between the letter in the input image 110 and each of the known alphabet classes.

In some embodiments, the input image 110 may be first transformed into an input tensor. As an example, if the input image 110 contains 32*32 pixels and each pixel has three color channels (Red, Green, Blue), its corresponding input tensor may have a size of 32*32*3, with a height as 32, a width as 32, and a depth (e.g., number of channels) as 3. For ease of description, the three dimensional size may be called an HWC format, where H refers to the height of the input tensor (e.g., 32 in the previous image example), W refers to the width of the input tensor (e.g., 32 in the previous image example), and C refers to the number of channels in the input tensor (e.g., 3 in the previous image example). In some cases, if there are multiple input tensors for a convolutional layer (e.g., when there are multiple images input into the convolution layer, or there are multiple input activation tensors received from a previous layer), each input tensor may be represented in an NHWC format, where N refers to an index of the input tensor within the batch of input tensors. In the following description, N may be omitted for simplicity (e.g., assuming there is only one input tensor) unless explicitly stated otherwise. It may be obvious for a person in the art to expand the embodiments to cover the cases with N>1.

In some embodiments, a CNN may include multiple convolution layers (e.g., the first convolution layer 120 and the second convolution layer 140 in FIG. 1). A convolution layer reduces an input tensor (e.g., the original input image, or an input tensor from a previous layer) into a form that is easier to process without losing features that are critical for getting a good prediction/classification. One or more feature detectors, e.g., edge detector, curve detector in image processing, may be involved in the convolution processing in the convolution layer. These feature detectors may be referred to as filters. Each of the filters may have the same number of channels as the input tensor does. For ease of description, this specification uses a term "sharing a plurality of channels" to express that each filter and the input tensor have the same number of channels. For example, the input tensor is a 32*32*3 matrix and an example filter may be a 3*3*3 matrix. A detailed explanation of the convolution processing may refer to the description of FIG. 2.

A convolution layer in a CNN may be followed by a nonlinear activation function to introduce nonlinearity into the CNN. Exemplary nonlinear activation functions include sigmoid, hyperbolic tangent, and rectified linear unit (ReLU). As shown in FIG. 1, a ReLU function (may also be referred to as a ReLU layer) follows each of the convolutional layers 120 and 140. The ReLU function may apply an elementwise activation function to filter out some outputs (activations) generated by the convolution layer 120 or 140. For example, a max(0,x) function may be adopted to filter out all the negative activations in the convolution output and only feed the positive activations to the next layer. A ReLU function may not change the size of the output activation, but limit the number of active neurons, since the negative activations are all zero-ed out, in order to improve the computational efficiency in the following layers.

A CNN may also include one or more pooling layers to provide a variety of computations that reduce the dimensionality of input tensors. In FIG. 1, the first pooling layer 130 and the second pooling layer 150 of the neural network 100 may each perform a down-sampling operation on the input tensor along the spatial dimension (height and width), but usually do not change the depth dimension (e.g., the number of channels).

A fully-connected (FC) layer in a neural network may learn non-linear combinations of high-level features as represented by the output from the previous layer (e.g., a pooling layer 150 in FIG. 1, or a convolution layer) and compute class scores accordingly. Referring to FIG. 1, the output from the pooling layer 150 may be first flattened (e.g., in a flatten layer 160) into a vector, from which an inherent non-learning function in that space may be learned by the FC layer 170 to calculate the final scores for a plurality of classes. Each of the scores may represent a quantified similarity between the alphabet in the input image and the corresponding class.

Figure 2:
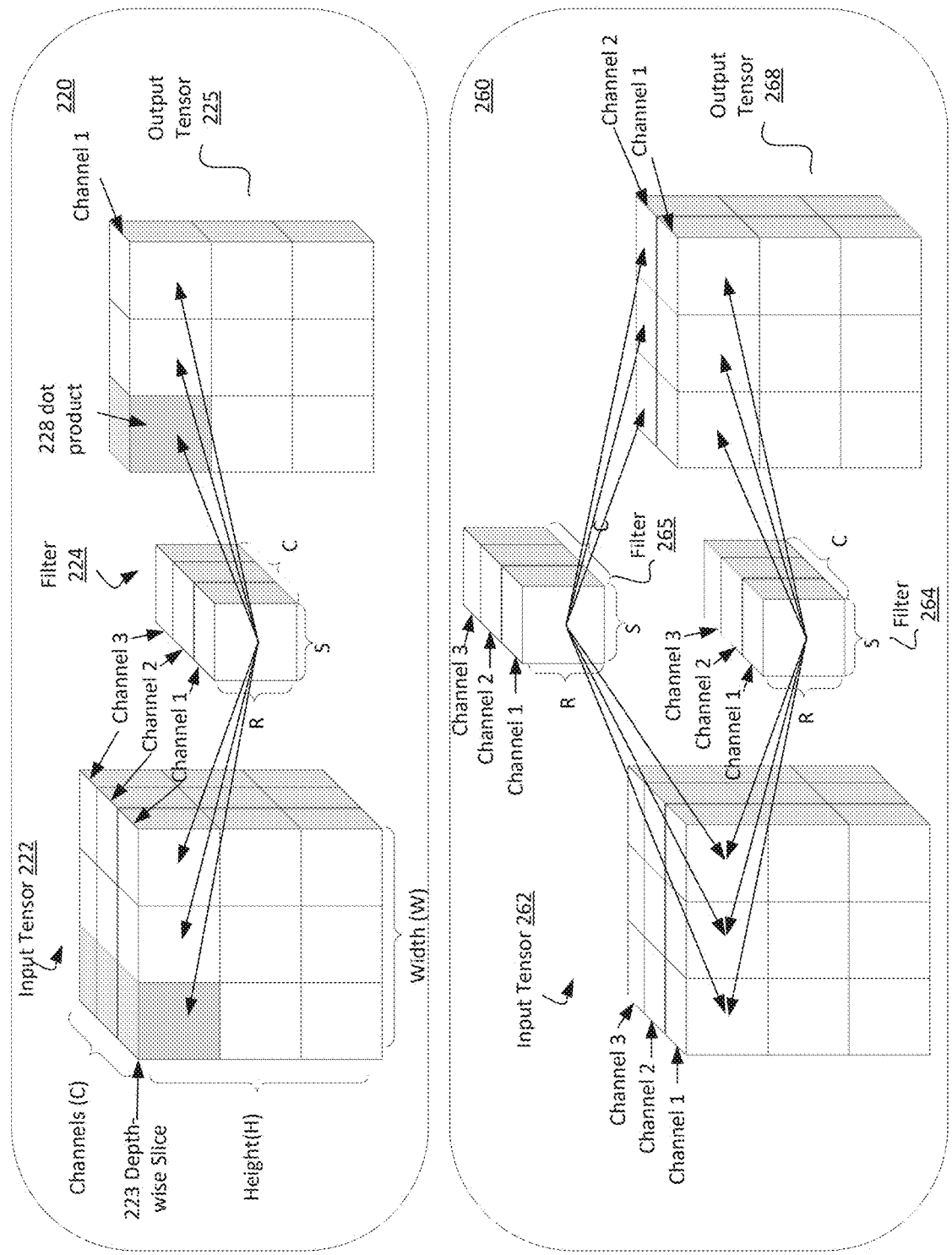
FIG. 2 illustrates exemplary convolution processing in accordance with various embodiments.

FIG. 2 illustrates exemplary convolution processing in accordance with various embodiments. The convolution processing 220 in FIG. 2 involves an input tensor 222, a filter 224, and an output tensor 225. The input tensor 222 may be denoted by its height (H), width (W), and number of channels (C). As shown in FIG. 2, the input tensor 222 may be a 3*3*3 matrix, with a height of 3, a width of 3, and a number of channels as 3. The height and the width (e.g., 3(H)*3(W)) of the input tensor 222 in each channel may be referred to as a 2-D input feature map. A tuple of {h, w, c} may point to one element of the 2-D input feature map in channel c. For example, {2,1,1} may point to the element of the 2-D input feature map in channel 1, with a position defined by {2,1} (e.g., height-wise index is 2, and width-wise index is 1). The filter 224 may be denoted by its height (R), width (S), and number of channels (C). In FIG. 2, the filter 224 may be a 1*1*3 matrix. The height and the width (e.g., 1(R)*1(S)) of the filter 224 in each channel may be referred to as a kernel (the filter 224 has three kernels in the three channels, respectively).

In some scenarios, a convolution processing may involve stride and padding. For example, when stride is 1, a filter convolves (e.g., moves, slides) one pixel at a time; and when stride is 2, the filter convolves two pixels at a time as it slides around. A larger stride produces a spatially smaller output tensor (smaller H*W in the output tensor). As another example, when a filter's spatial size (height*width) is greater than 1*1 (e.g., 3*3, or 5*5), the input tensor may pad with zeros around its borders in order to apply the filter and control the spatial size of the output tensor, e.g., to preserve the spatial size of the input tensor so that the input and output height and width are the same. In FIG. 2, it is assumed that no padding is performed to the input tensor 222 and the stride is 1.

During the convolution processing 220 shown in FIG. 2, MAC operations are performed on the filter 224 and each depth-wise slice, such as the first depth-wise slice 223, of the input tensor to generate a dot product, such as the dot product 228. For example, the first depth-wise slice 223 of the input tensor 222 is a 1*1*3 tensor at the top left of the input tensor 222 (the three grey cubes). Both the first depth-wise slice 223 and the filter 224 have a size of 1*1*3. After the MAC operations, the generated dot product 228 may be assembled as a part of the output tensor 225. As such, the output tensor 225 may be determined after the filter 224 convolves (e.g., moves) through all the depth-wise slices in the input tensor 222 (9 slices in FIG. 2). The number of channels in the output tensor 225 equals to the number of filters that have applied during the convolution. Since the convolution processing 220 only uses one filter 224, the corresponding output tensor 228 only has one channel.

In comparison, the convolution processing 260 involves two filters 264 and 265. By convolving the filter 264 through the input tensor 262, the values of the output tensor 268 in the first channel (e.g., a 2-D output feature map in channel 1) may be determined. By convolving the filter 265 through the input tensor 262, the values of the output tensor 268 in the second channel (e.g., a 2-D output feature map in channel 2) may be determined. Accordingly, the resulting output tensor 268 comprises two channels of 2-D output feature maps.

It may be noted that some operations during a convolution processing may be parallelized. For example, MAC operations performed on a filter are independent from the ones of another filter as different filters generate 2-D output feature maps for different output channels. As another example, the depth-wise slices in the input tensors are independent from each other as they generate values for different positions on each 2-D output feature map. The theoretically ideal parallelism may be achieved if all these operations can be parallelized among a plurality of processing entities (e.g., processors, cores, or threads). However, since real-world applications may have a large number of filters and massive input tensors, chasing the theoretically ideal parallelism may require hardware with unattainable computing capacities (e.g., with enormous number of processing entities and memory exchanging mechanism). The embodiments disclosed in the following provide a method (and corresponding system, storage medium) to achieve the ideal parallelism by fully utilizing the parallel processing capability of a given hardware, which is a more scalable and practical approach.

Figure 3:
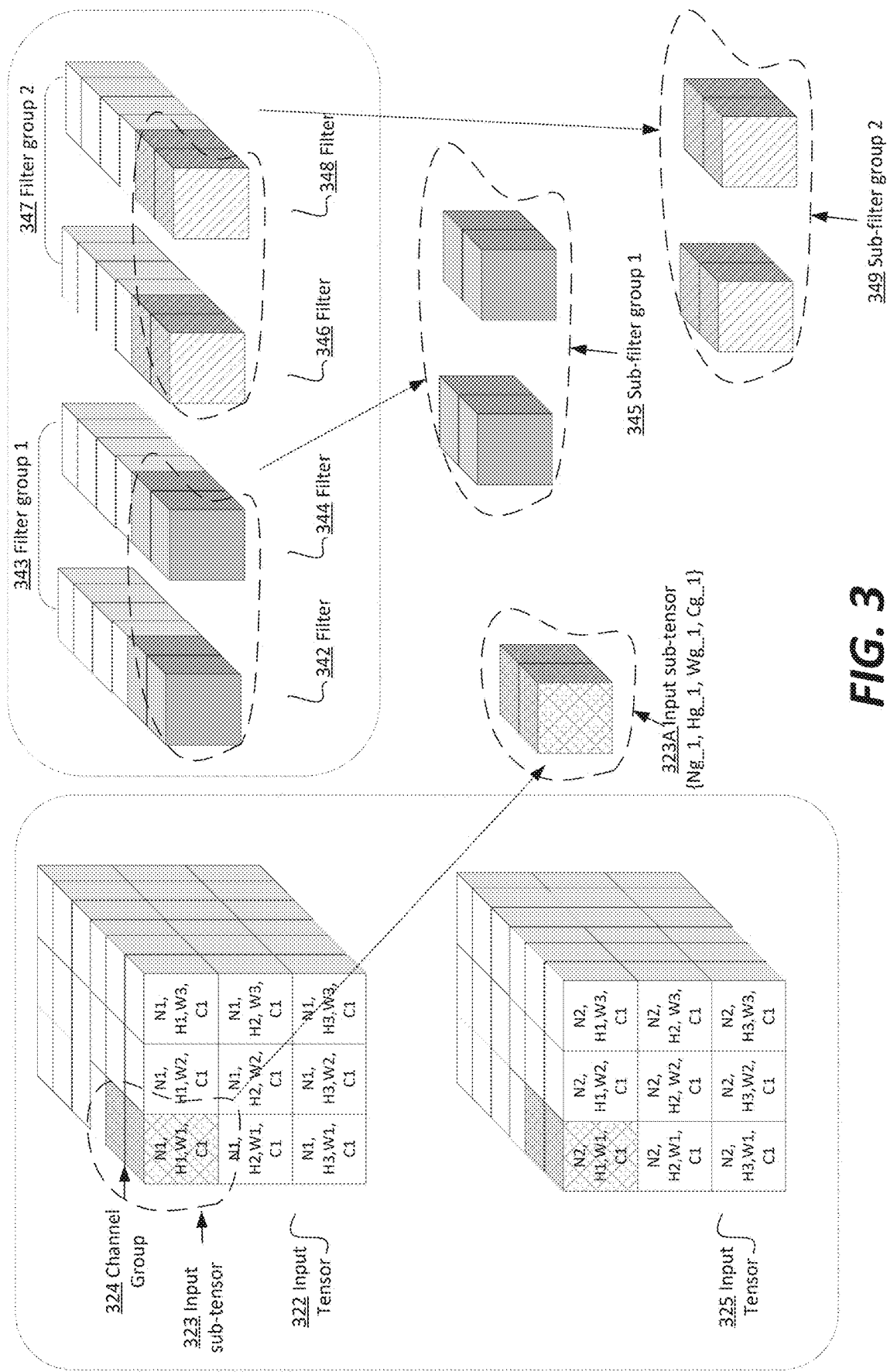
FIG. 3 illustrates an exemplary method for segmenting input tensors and filters in accordance with various embodiments.

FIG. 3 illustrates an exemplary method for segmenting input tensors and filters in accordance with various embodiments. As described above, each input tensor (322 or 325) and each filter (342, 344, 346, or 348) share a plurality of channels (i.e., having the same number of channels). In some embodiments, the process of segmenting the input tensors may comprise segmenting each of the input tensors along its height dimension, width dimension, and depth dimension into a plurality of sub-tensors. By segmenting an input tensor such as 322 along its depth dimension, the input channels (e.g., the channels of the input tensors) are segmented into a plurality of channel groups 324, with each channel group 324 comprising a number of channels. In some embodiments, each of the filters may be similarly segmented along its depth dimension into a plurality of sub-filters according to the plurality of channel groups 324. That is, each of the sub-tensor of an input tensor and each of the sub-filter of a filter includes a same number of channels.

According to one aspect of the specification, the segmenting process of an input tensor may be described as following steps: dividing the plurality of channels into a plurality of channel groups, and segmenting the input tensor into a plurality of sub-tensors according to the plurality of channel groups. In a particular example, the input tensor may be segmented, along its depth dimension, into a plurality of groups with an equal size, i.e., the same number of channels denoted as Cg (i.e., channels per group). In some embodiments, the segmenting process of the input tensor may further comprise: segmenting the input tensor along its height dimension and its width dimension. After segmentation, each of the sub-tensors comprises a height denoted as Hg (by segmenting the input tensor along the height dimension), a width denoted as Wg (by segmenting the input tensor along the width dimension), and a number of channels that equals to Cg (by segmenting the input tensor along the depth dimension).

Referring to FIG. 3. each of the input tensors (322 or 325) has a size of 3*3*6. The 6 channels are first divided into 3 groups, with each group comprising 2 channels (Cg=2), where group 1 comprises channels 0 to 1, group 2 comprises channels 2 to 3, and group 3 comprises channels 4 to 5. Based on the channel groups, the input tensor 322 are segmented into 27 sub-tensors, each with a size 1*1*2 (e.g., a height as 1, a width as 1, and a number of channels as 2). The sub-tensor 323 in FIG. 3 be represented with a four-tuple {Ng_1, Hg_1, Wg_1, Cg_1} 323A, where Ng_1 refers to the first input tensor in the batch of input tensors, the pair of Hg_1 and Wg_1 refers to the top left corner position of each 2-D input feature map in the input tensor, and Cg_1 refers to the first channel group 324.

In some embodiments, once the number of channels in each channel group 324 is determined (i.e., after the plurality of channels are divided into channel groups), the segmenting the plurality of filters may comprise following steps: (grouping step) grouping the plurality of filters into a plurality of filter groups; (segmenting step) segmenting each of the plurality of filters into a plurality of sub-filters according to the plurality of channel groups; and (determining step) determining the sub-filters of a same filter group and of a same channel group as a sub-filter group. In some embodiments, each of the filter groups comprises a same number of filters, and thus each of the sub-filter groups comprises a same number of sub-filters. In some cases, the last filter group may comprise a smaller number of filters, and thus each of the sub-filter groups derived from the last filter group may comprise a smaller number of sub-filters.

Referring back to FIG. 3, among the four filters 342, 344, 346, and 348, each filter has a size of 1*1*6 (i.e., the input tensor 322 or 325 and the plurality of filters share 6 channels). During the grouping step, the four filters 342, 344, 346, and 348 may be divided into a plurality of groups, such as filter group 1 (343) comprising two filters (342 and 344) and filter group 2 (347) comprising two filters (346 and 348). During the segmenting step, each of the four filters 342, 344, 346, and 348 is segmented into a plurality of sub-filters according to the size of the channel group 324. Still using the same example as above where each channel group 324 comprises two channels, each of the 1*1*6 filters can be segmented into three sub-filters with each sub-filter comprising two channels. At last, the sub-filters of the same filter group and of the same channel group are determined as a sub-filter group during the determining step. As shown in FIG. 3, the sub-filter group 1 (345) comprises two sub-filters from the filter group 1 (343) and from the first channel group 324; the sub-filter group 2 (349) comprises two sub-filters from the filter group 2 (347) and from the first channel group 324. It may be appreciated that the above described grouping step and the segmenting step may be performed in any order or in parallel. The small numbers (e.g., the number of input tensors and filters, the size of each input tensor and each filter) in the example shown in FIG. 3 are merely illustrative and for simplicity, it may be obvious for a person in the art to scale the described segmentation process to scenarios with larger numbers.

Figure 4:
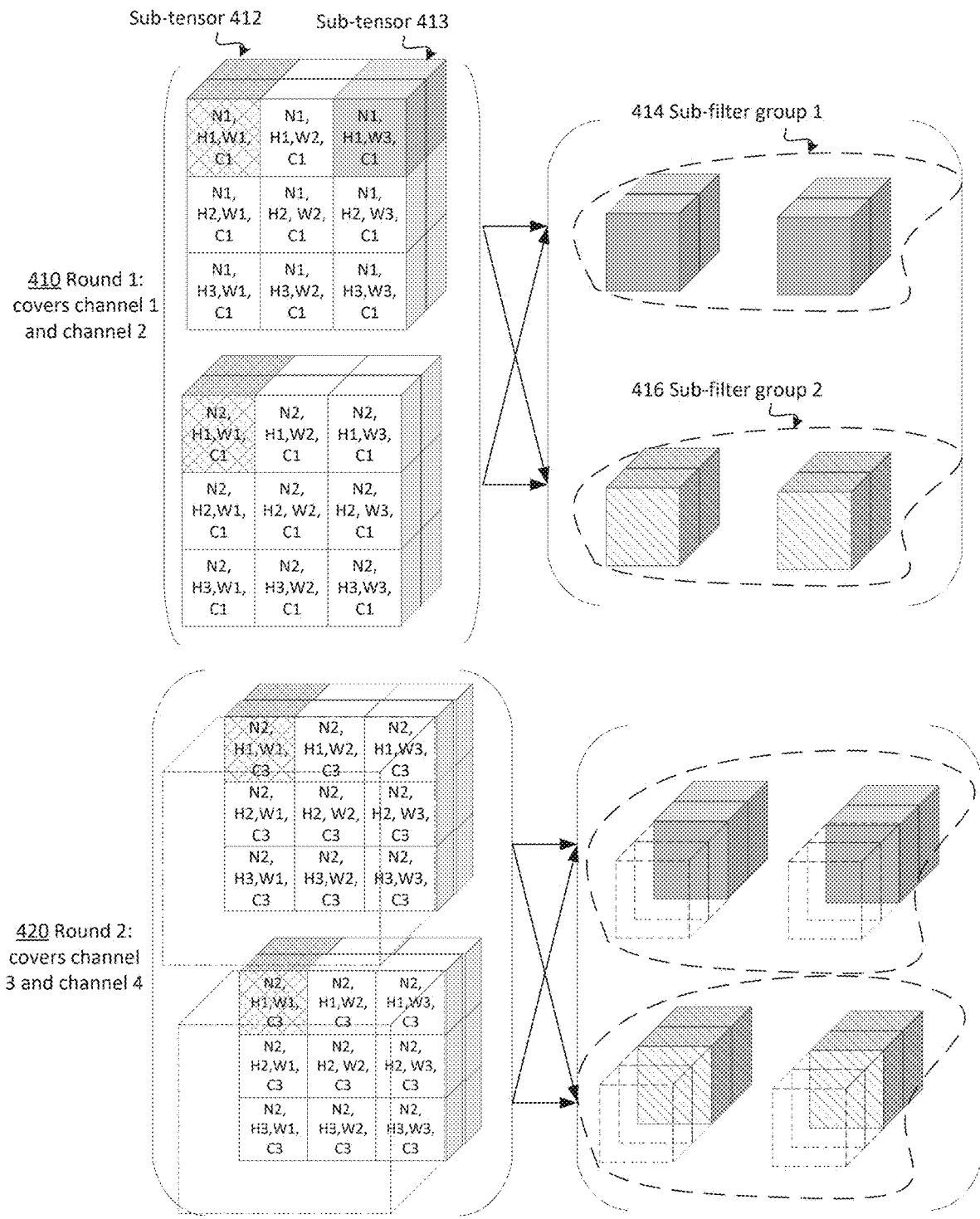
FIG. 4 illustrates an exemplary parallel processing scheme of a convolution processing in accordance with various embodiments.

FIG. 4 illustrates an exemplary parallel processing scheme of a convolution processing in accordance with various embodiments. As described above, a convolution processing of a convolution layer within a neural network may involve performing MAC operations on a batch of input tensors and a plurality of filters. Parallelly performing these MAC operations may greatly improve the throughput and performance of the neural network.

In some embodiments, once the input tensors and the filters are segmented (examples are illustrated in FIG. 3), the corresponding convolution processing may be parallelized in various ways. An exemplary parallel processing configuration may involve (1) sequentially processing each channel group; (2) for each channel group, parallelly performing convolutions on the sub-tensors and the sub-filter groups from that channel group using a plurality of processing entities, with each processing entity handling a sub-tensor and a sub-filter group; and (3) accumulating the outputs from the plurality of processing entities after each round of parallel processing.

This exemplary configuration is illustrated in FIG. 4, where a plurality of combinations of the sub-tensors and the sub-filter groups are respectively assigned to a plurality of processors, wherein each of the plurality of combinations comprises a sub-tensor and a sub-filter group corresponding to the same channel group. For example, the first round (410) handles the sub-tensors and the sub-filter groups from the first channel group covering channel 1 and channel 2, and the second round (420) handles the sub-tensors and the sub-filter groups from the second channel group covering channel 3 and 4. In FIG. 4, only the 2-D input feature maps in channels 1 and 3 are labeled in FIG. 4, the 2-D input feature maps in channels 2 and 4 are not labeled. During each round, a plurality of combinations of the sub-tensors (e.g., the input sub-tensors) and the sub-filter groups may be determined and parallelly assigned to a plurality of processing entities to perform MAC operations.

Taking the first round (410) in FIG. 4 as an example, sub-tensor (412) and sub-filter group 1 (414) may form a first combination to be handled by a first processing entity, and the sub-tensor (412) and sub-filter group 2 (416) may form a second combination to be handled by a second processing entity. The outputs generated by the first processing entity handling the first combination are partial sums that may be aggregated and assembled into the output channels corresponding to the filters in the sub-filter group 1 (414); and the outputs generated by the second processing entity handling the second combination are partial sums that may be aggregated and assembled into the output channels corresponding to the filters in the sub-filter group 2 (416). Since different filters are mapped to different output channels, the first combination and the second combination are independent from each other and can be processed in parallel. Similarly, a third combination comprising sub-tensor (413) and the sub-filter group 1 (414) may be handled by a third processing entity. The outputs generated by the third processing entity are partial sums to be aggregated and assembled into the output channels corresponding to the filters in the sub-filter group 1 (414). It may be appreciated that the partial sums generated by the first processing entity and the partial sums generated by the third processing entity are mapped to different positions on the same 2-D output feature map. As a result, the third combination is also independent of the first and the second combinations, and thus can be processed in parallel.

Besides the exemplary parallel processing configuration shown in FIG. 3, alternative configurations may also be feasible. Another example configuration may comprise: sequentially iterating the sub-filter groups; for each sub-filter group, determining a plurality of combinations with each comprising the sub-filter group and a sub-tensor from the same channel group, and parallelly processing the plurality of combinations. Yet another example configuration may comprise: sequentially iterating each feature map position (determined by a height index and a width index) on the 2-D feature maps of an input tensor; for each feature map position, determining a plurality of combinations with each comprising a sub-tensor associated with the feature map position and a sub-filter group from the same channel group, and parallelly processing the plurality of combinations.

Figure 5:
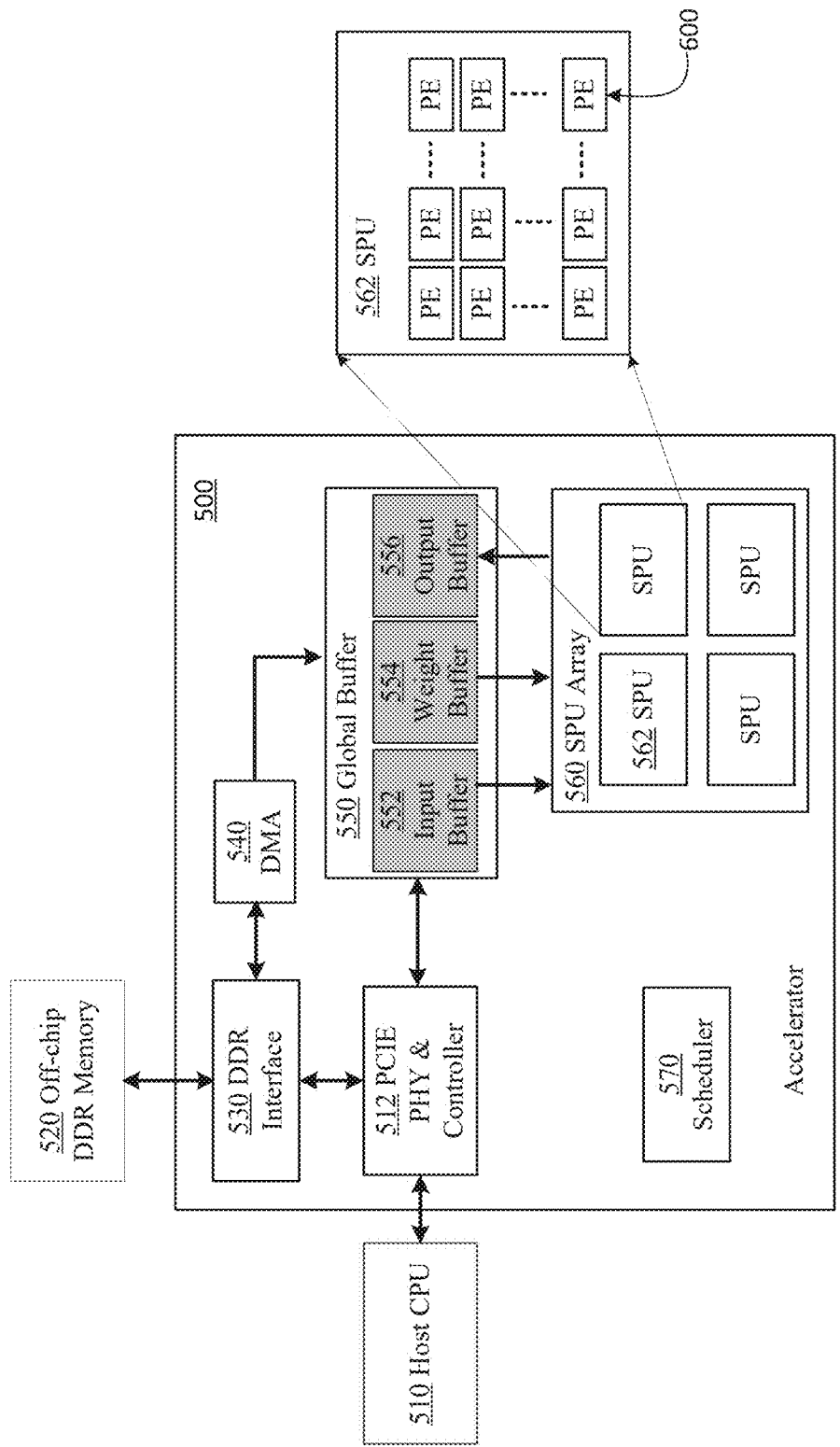
FIG. 5 illustrates an exemplary system diagram for parallel convolution processing in accordance with various embodiments.

FIG. 5 illustrates an exemplary system diagram for parallel convolution processing in accordance with various embodiments. The architecture shown in FIG. 5 comprises a computer system designed to perform inferences when a neural network is loaded and runs. In some embodiments, such a computer system is implemented as a hardware accelerator 500. Some components in the hardware accelerator 500 may collaborate in a specific way to improve the throughput and energy efficiency of neural networks by facilitating parallel convolution computations on a plurality of processing entities. The accelerator 500 is merely illustrative, and may comprise more, fewer, or alternative components. The hardware accelerator 500 may be designed as a reconfigurable device such as a field-programmable gate array (FPGA), or an application-specific integrated circuit (ASIC).

As shown in FIG. 5, the hardware accelerator 500 may comprise a scheduler 570 to control the workflow within the accelerator 500 and interactions with off-chip components such as a host CPU 510 and double data rate (DDR) memories 520. For example, the accelerator 500 may interact with the host CPU 510 through a peripheral component interconnect express (PCIe) physical layer (PHY) controller 512, and an off-chip DDR memory 520 through a DDR interface 530. The accelerator 500 may fetch data from the off-chip DDR memory 520 through a direct memory access (DMA) controller 540 that communicates with the off-chip DDR memory 520 via the DDR interface 530. The fetched data may be stored in an on-chip buffer, called global buffer 550, to prepare for parallel convolution computations. The global buffer 550 may be logically divided into multiple sections, such as an input buffer 552, a weight buffer 554, and an output buffer 556. The input buffer 552 may store data associated with input tensors, the weight buffer 554 may store data associated with filters, and the output buffer 556 may store data associated with results of convolution computations (e.g., output tensors). The global buffer 550 may exchange data with an array 560 of Sparse Processing Unit (SPU) 562 to perform convolution computations. The "sparse" in the name of SPU indicates that the SPU array 560 is specifically designed to efficiently perform convolution computations involving sparseness (e.g., sparse input tensors, and/or sparse filters). Each of the SPU 562 may comprise a plurality of processing entities (PE) 600, where each PE 600 may handle a unit amount of convolution computation (e.g., one PE 600 may perform MAC operations on one sub-tensor and one sub-filter group).

Figure 6A:
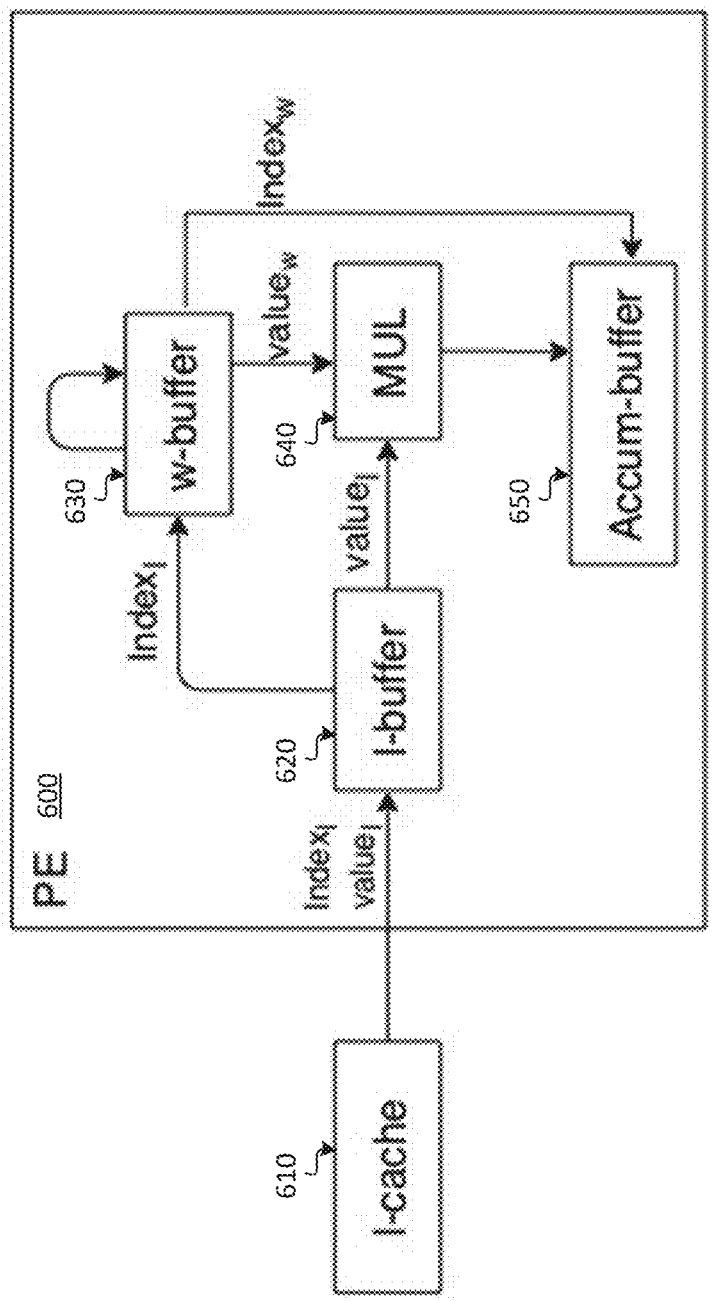
FIG. 6A illustrates an exemplary system diagram of a processing entity (PE) for parallel convolution processing in accordance with various embodiments.

FIG. 6A illustrates an exemplary system diagram of a processing entity (PE) 600 for parallel convolution processing in accordance with various embodiments. The PE 600 in FIG. 6A may comprise various components including an I-buffer 620 storing data associated with an input sub-tensor, a W-buffer 630 storing data associated with a sub-filter group, a multiplier 640 (MUL) and an accumulation buffer (Accum-buffer) 650. The components in FIG. 6A are exemplary, and depending on the implementation, the PE 600 may comprise more, fewer, or alternative components.

As shown in FIG. 6A, the PE 600 may fetch data from an I-cache 610 into its I-buffer 620. The I-cache 610 may refer to a cache associated with one SPU 562 (in FIG. 5) in which the PE 600 is located. For example, the SPU 562 may fetch one or more input sub-tensors from the global input buffer 552 (in FIG. 5) into its I-cache 610 to perform parallel convolution computations therein. Subsequently, each PE 600 within the SPU 562 may fetch, for example, one sub-tensor at a time into its I-buffer 620 to process.

In some embodiments, instead of fetching an entire sub-tensor from the I-cache 610 into the I-buffer 620, only the non-zero input values in the sub-tensor may be fetched. This way, a sparse tensor (thus a sparse sub-tensor) may be stored in the I-buffer 620 in a compact format, and significantly reduces its memory footprint. In some embodiments, each non-zero input value of a sub-tensor may be represented as an index-value pair, where the index corresponds to the channel in which the non-zero input value is located, and the value comprises the non-zero input value. For example, if a sub-tensor of 1*1*16 (with 16 channels) has only one non-zero input value X located in the channel 3, the representation of the sub-tensor in the I-buffer 620 may be {3, X}. In some embodiments, the I-cache 610 of one SPU 562 may be shared by neighboring PEs 600. For example, if the kernel size in the filters is X*X with X>1 and the stride size is less than X, a convolution computation may be performed on multiple sub-tensors (e.g., when a filter straddles multiple sub-tensors). That is, after one PE 600 fetches a sub-tensor, it may need to fetch some data of the neighboring sub-tensors to perform the MAC operations.

Similarly, the W-buffer 630 in the PE 600 may only store the non-zero weights of a sub-filter group corresponding to the input sub-tensor in the I-buffer 620 (i.e., the sub-filter group and the input sub-tensor from the same channel group). This way, a sparse sub-filter group may be stored in the W-buffer 630 in a compact format, and significantly reduces its memory footprint. In some embodiments, if a non-zero weight exists in a sub-filter within a sub-filter group, the non-zero weight may be represented as an index-value pair, where the index comprises a first identifier corresponding to the channel in which the non-zero weight is located, and a second identifier corresponding to the filter that the sub-filter belongs to. For example, if a sub-filter group comprises two 1*1*16 sub-filters: sub-filter 1 belonging to filter A and comprising one non-zero weight X in channel 5, and sub-filter 2 belonging to filter B and comprising one non-zero weight Y in channel 3, then the sub-filter group may be stored as {5, A, X} and {3, B, Y} in the W-buffer 630.

In some embodiments, with the non-zero values in the sub-tensor and the sub-filter group being stored as index-value representations, the PE 600 may perform MAC operations by: obtaining a first index-value representation of a first non-zero value in the sub-tensor associated with the processor, wherein the first index-value representation comprises a first index corresponding to a first channel in which the first non-zero value is located; obtaining, based on the first index, a second index-value representation of a second non-zero value that is located in the first channel and is in a sub-filter of the sub-filter group associated with the processor, wherein the second index-value representation comprises a second index corresponding to a filter in which the sub-filter is located; performing MAC (multiplication and accumulation) operations on the value of the first index-value representation and the value of the second index-value representation to obtain an output; and adding the output to a partial sum identified by the second index of the second index-value representation.

For example, the PE 600 may iterate the non-zero input values (represented as index-value pairs) in I-buffer 620. For each non-zero input value, the $index_i$ (the index of the non-zero input value) may be used to look up the W-buffer 630 for the corresponding non-zero weight to perform a multiplication. Still using the above-mentioned examples, for the non-zero input value {3, X} stored in the I-buffer 620, the index 3 (channel identifier) is used to look up for the corresponding non-zero weight in the W-buffer 630. Between the {5, A, X} and {3, B, Y} in the W-buffer 630, {3, B, Y} may be determined as it is indexed by the channel identifier 3.

After the corresponding non-zero weight is determined, the non-zero input value of the input tensor from the I-buffer 620 and the non-zero weight from the W-buffer 630 may be multiplied in the MUL 640 to generate a result. This result may then be added to an existing partial sum stored in the Accum-buffer 650. The existing partial sum may be located based on the second identifier in the index-value representation of the non-zero weight. For example, after the non-zero input value {3, X} and the non-zero weight {3, B, Y} are determined, the MUL 640 may calculate a product as X*Y, and send the product to the Accum-buffer 650 for accumulation. The Accum-buffer 650 may look up the corresponding partial sum based on the filter identifier B and accumulate (e.g., add) the product X*Y into the corresponding partial sum.

Figure 6B:
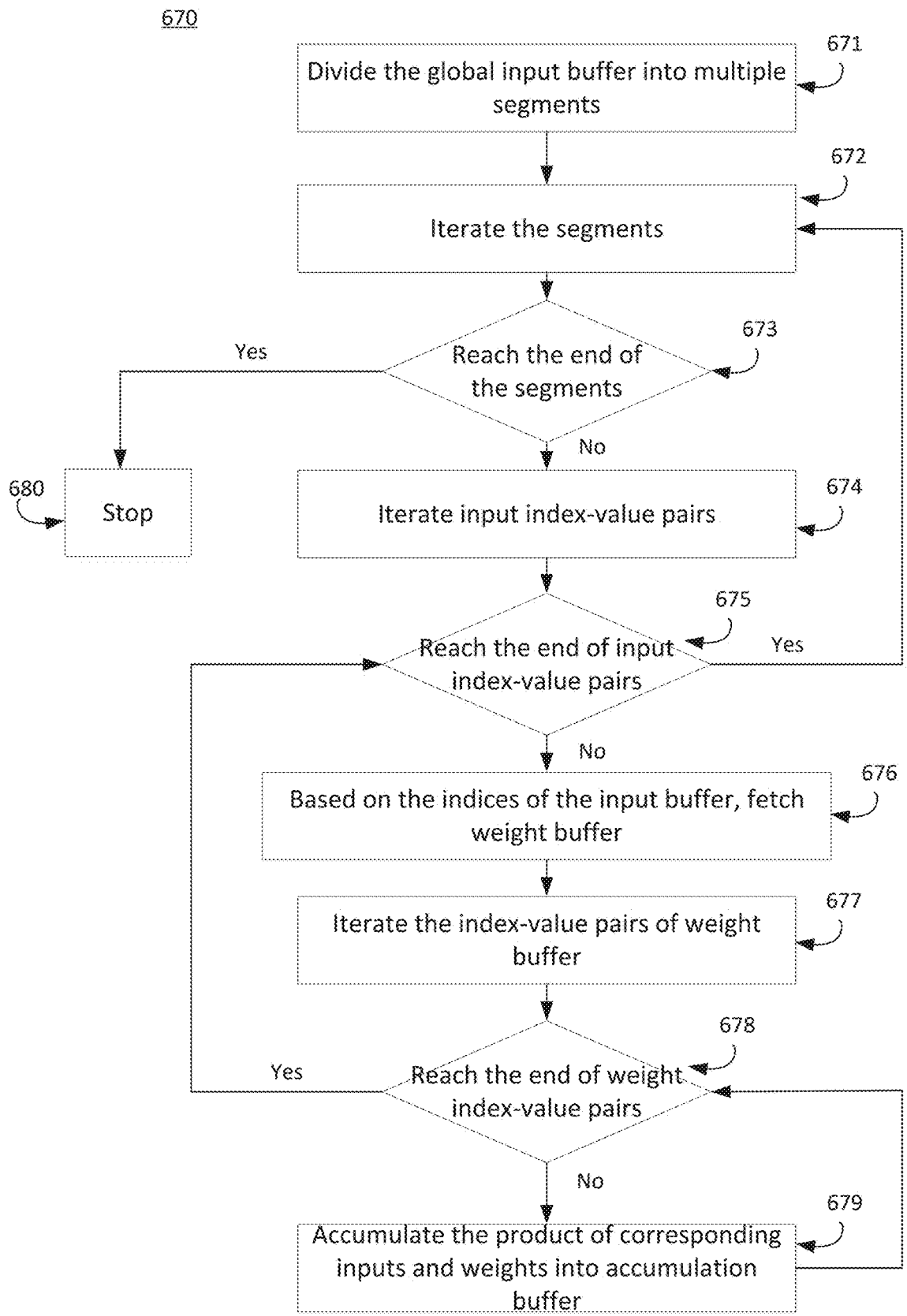
FIG. 6B illustrates an exemplary method for parallel convolution processing in accordance with various embodiments.

FIG. 6B illustrates an exemplary method for parallel convolution processing in accordance with various embodiments. The flow chart in FIG. 6B demonstrates an exemplary method 670 for a global input buffer (such as 552 in FIG. 5), a global weight buffer (such as 554 in FIG. 5), an I-cache or an input cache (such as 610 in FIG. 6A), and a PE (such as 600 in FIG. 6A) to interact with each other. The steps included in the method 670 in FIG. 6B are illustrative and may comprise more, fewer, or alternative steps depending on the implementation.

In step 671, the data in the global input buffer are divided into multiple segments. Here, the data in the global input buffer may refer to the input tensors fetched from the off-chip DDR memory (such as 520 in FIG. 5). The input tensors may be segmented into a plurality of sub-tensors as shown in FIG. 3. In some embodiments, each of the SPUs (such as 562 in FIG. 5) may be assigned a portion of the plurality of sub-tensors to process. The assigned sub-tensors may be stored in the I-cache associated with the SPU, and the I-cache is shared by one or more of the plurality of processors. In some embodiments, each of the plurality of channel groups comprises one or more of the plurality of sub-tensors, and each of the plurality of sub-tensors is associated with an identifier identifying a position of the sub-tensor within the channel group in which the sub-tensor is located, and the sub-tensors stored in the I-cache may be associated with the same identifier from the plurality of channel groups.

In step 672 and step 673, each of the SPU may iterate through the assigned sub-tensors in its I-cache, and stop the method 670 at step 680 when the iteration reaches the end of the sub-tensors (all sub-tensors are processed). While iterating, the SPU may assign the sub-tensors to the plurality of PEs for parallel processing.

In step 674, each of the PEs may iterate through the non-zero input values of an assigned sub-tensor, where the non-zero input values are represented as index-value pairs. By checking if all the non-zero input values are enumerated at step 675, the PE may stop the iteration and goes back to step 672 to fetch the next sub-tensor into its I-cache for processing.

In step 676, the index portion of the index-value pair for a non-zero input value may be used to fetch weights (values in filters) from the global weight buffer into the W-buffer of the PE. As described in FIG. 6A, the index portion of the index-value pair for the non-zero input value may comprise a channel identifier corresponding to the channel in which the non-zero input value is located. Based on this channel identifier, the corresponding filter (from the same channel identified by the channel identifier) may be fetched. The weight fetching process may be implemented in various ways. In some embodiments, a weight buffer header may be created to facilitate the lookups for the non-zero weights within a filter. The weight buffer header may include information such as the address of the first non-zero weight of a filter (as a starting address), and a length representing the number of non-zero weights in the filter. Since all the non-zero weights are stored contiguously, the starting address and the corresponding length may instruct a weight fetcher to perform efficient batch memory reading without the need to do lookups for each non-zero weight.

In step 677, each of the non-zero weights (index-value pairs) is iterated to find the weight from the same channel as the non-zero input value. When the iteration reaches its end at step 678, the next non-zero input value may be fetched into the I-cache to start the next iteration.

In step 679, once the non-zero input value and the non-zero weight from the same channel are identified, the PE may compute a product of the non-zero input value and the non-zero weight, and accumulate the product into the accumulation buffer.

Figure 6C:
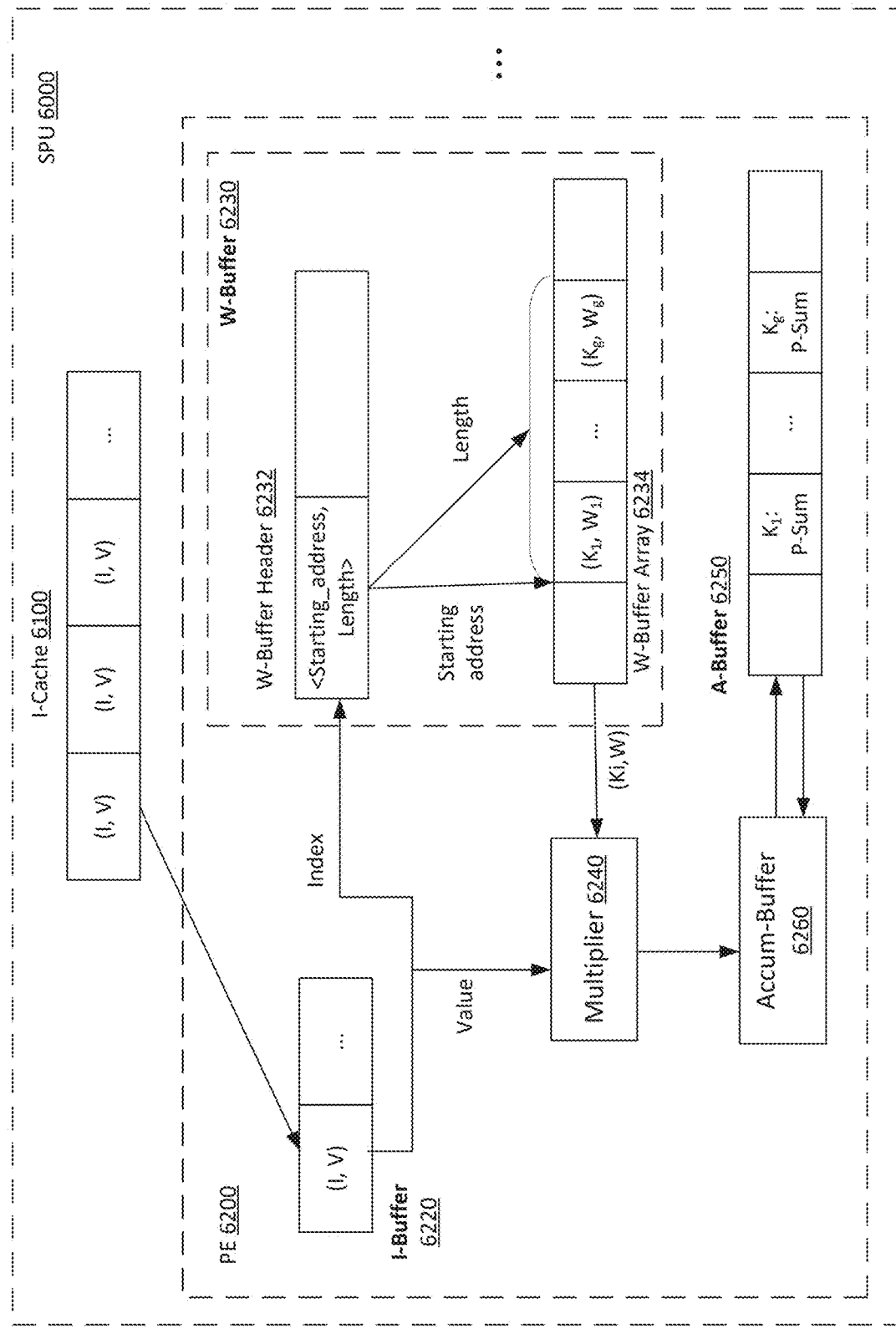
FIG. 6C illustrates an exemplary system architecture for parallel convolution processing in accordance with various embodiments.

FIG. 6C illustrates an exemplary system architecture for parallel convolution processing in accordance with various embodiments. The illustrated system architecture demonstrates the components within a Sparse Processing Unit (SPU) 6000 and a processing entity (PE) 6200 and the interactions among the components. Depending on the implementation, the system architecture may include more, fewer, or alternative components.

In some embodiments, the SPU 6000 may include an I-Cache 6100 storing non-zero input values of an input tensor as a plurality of index-value pairs. For example, after the input tensor is segmented into a plurality of sub-tensors as shown in FIG. 3, each channel group may include a plurality of sub-tensors, and each sub-tensor may be associated with an identifier (such as N*Hg*Wg) identifying a position of the sub-tensor within a channel group. In this case, the sub-tensors associated with the same identifier from a plurality of channel groups may be stored into the I-Cache 6100 of the SPU 6000, where the I-Cache 6100 may be accessed by one or more neighboring PEs 6200 within the SPU 6000.

In some embodiments, the non-zero input values of a sub-tensor may be stored as index-value pairs by: iterating each input value of the sub-tensor to identify one or more non-zero input values; for each of the one or more non-zero input values: determining a channel identifier corresponding to a channel that the non-zero input value is located in; and storing the channel identifier and the non-zero input value as a first index-value pair.

As mentioned above, one SPU 6000 may comprise a plurality of PEs 6200 that work in a similar way except for working with different data fetched from the I-Cache 6100. Referring to FIG. 6C, the illustrated PE 6200 may fetch one or more index-value pairs from the I-Cache 6100 into its I-Buffer 6220, where the fetched index-value pairs may be from the same sub-tensor. In some embodiments, the PE 6200 may also store non-zero weights from a sub-filter group in a W-Buffer 6230, where the sub-filter group corresponds to the sub-tensor, i.e., the sub-filter group and the sub-tensor are from the same channel group.

In some embodiments, the non-zero weights of a sub-filter group may be stored as index-value pairs by: iterating each weight in the sub-filter group to identify one or more non-zero weights; for each of the one or more non-zero weights: determining a channel identifier corresponding to a channel that the non-zero weight is located in; and storing the channel identifier and the non-zero weight as a second index-value pair. In some embodiments, the non-zero weights may be stored in a multi-level memory hierarchy by: iterating each weight in the sub-filter group to identify one or more non-zero weights; for each of the one or more non-zero weights: determining a channel identifier corresponding to a channel that the non-zero weight is located in; determining a kernel identifier corresponding to a kernel that the non-zero weight belongs to; and storing a pointer in a weight buffer header indexed by the channel identifier, the pointer pointing to a second index-value pair stored in a weight buffer array, wherein the second index-value pair comprises the non-zero weight and is indexed by the kernel identifier.

For example in FIG. 6C, the W-Buffer 6230 comprises a W-Buffer Header 6232 and a W-Buffer Array 6234. Each entry in the W-Buffer Header 6232 includes a starting address pointing to an offset in the W-Buffer Array 6234, and a length indicating the number of non-zero weights of the sub-filter group that are stored in the W-Buffer Array 6234 starting from the starting address. Each of the <starting address, length>entries in the W-Buffer Header 6232 corresponds to a channel (a channel in the sub-filter group may comprise a plurality of kernels) and may be located based on a corresponding channel identifier. That is, the starting address points to the first non-zero weight stored in the W-Buffer Array 6234 that is in the sub-filter group and in the corresponding channel. Each entry in the W-Buffer Array 6234 may comprise a (K, W) pair, indicating a non-zero weight W from kernel K, where K is a kernel identifier. For example, the ($K_1$, $W_1$) refers to the first non-zero weight in the sub-filter group and in the corresponding channel, and the first non-zero weight is from kernel 1 with value $W_1$. Following ($K_1$, $W_1$), the rest of the non-zero weights from the sub-filter group and from the corresponding channel (may from different kernels) may be stored contiguously in the W-Buffer Array 6234. For example, (Kg, Wg) in FIG. 6C may refer to the last non-zero weight in the sub-filter group and in the corresponding channel, and the last non-zero weight is from kernel g with Wg.

In some embodiments, the PE 6200 may keep an A-Buffer 6250 storing partial sums, each partial sum corresponding to a kernel. These partial sums may be indexed by kernel identifiers. For example, the partial sum corresponding to kernel 1 may be indexed by $K_1$, and the partial sum corresponding to kernel g may be indexed by $K_g$.

In some embodiments, the PE 6200 may iterate through the one or more index-value pairs in its I-Buffer 6220. For each of the index-value pairs, the PE 6200 may search the W-Buffer Header 6232 based on the index to locate a <starting address, length> entry. Based on the <starting address, length> entry, the PE 6200 may sequentially fetch (K, W) pairs from the W-Buffer Array 6234, starting from the offset identified by the starting address for "length" number of cycles. Each fetched (K, W) comprises a kernel identifier and a non-zero weight. The non-zero weight and the non-zero input value may be fed into a multiplier 6240 to determine a product. Meanwhile, the PE 6200 may retrieve a partial sum from the A-Buffer 6250 based on the kernel identifier. Subsequently, the retrieved partial sum and the product may be accumulated in an Accum-Buffer 6260 to obtain a new partial sum, which may be stored back into the Accum-Buffer 6260 and indexed by the kernel identifier.

Figure 7:
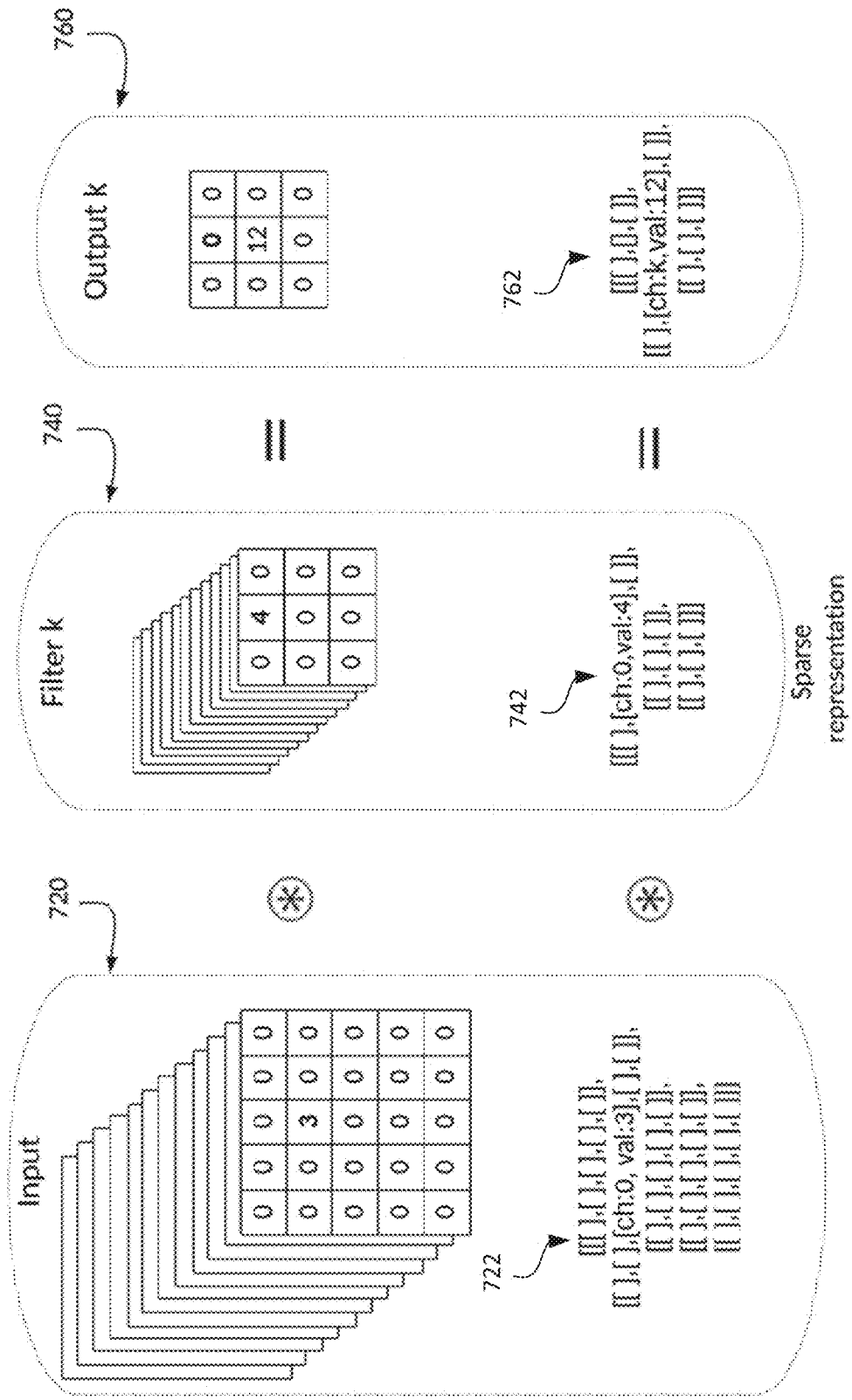
FIG. 7 illustrates exemplary index-value representations of an input tensor and a filter in accordance with various embodiments.

FIG. 7 illustrates exemplary index-value representations of an input tensor and a filter in accordance with various embodiments. In FIG. 7, the input tensor 720 may be understood as an input sub-tensor segmented from an input tensor, and the filter 740 may be understood as a filter, a sub-filter, or a sub-filter group. The input tensor 720 and the filter 740 are presumed to be from the same channel group comprising a plurality of channels. The input tensor 720 comprises a 5*5 2-D input feature map in each channel, and the filter 740 comprises a 3*3 kernel in each channel. The input tensor 720 and the filter 740 may be processed within a PE.

As shown in FIG. 7, the input tensor 720 and the filter 740 are presumed extremely sparse, with only one non-zero value each in channel 0 and kernel 0 (the kernel of filter 740 in channel 0). For simplicity, the following description assumes that all the other channels in the input tensor 720 and all other kernels in filter 740 have only zeros. The non-zero input value 3 in the input tensor 720 channel 0 is located at position {1, 2} (assuming the height index and width index start from 0). The non-zero weight 4 in kernel 0 of filter 740 channel 0 is located at position {0, 1}.

In some embodiments, the non-zero values of an input tensor may be stored as index-value pairs by: identifying one or more non-zero input values in the sub-tensor; for each of the one or more non-zero input values: determining a channel identifier corresponding to a channel that the non-zero input value is located in; and storing the channel identifier and the non-zero input value as a first index-value pair. For example, the non-zero input value 3 in the input tensor 720 may be represented as an index-value pair, with the index being the channel in which the non-zero input value is located (here, channel 0), and the value being the non-zero input value (here, 3). The index may be used to look for the corresponding kernel in the filter 740 from the same channel (i.e., channel 0), and the value may be used to generate a product. In some embodiments, the position information of the non-zero input value may also be necessary to determine where to accumulate the product. Such position information may be explicitly included in the corresponding index-value pair representation, or implicitly obtained as part of the iteration process performed by a PE.

In some embodiments, the zero input values in the input tensor 720 may be stored as NULL pointers (i.e., the zero values are not stored). These NULL pointers may not consume storage space for the actual values except for a few bytes for storing the pointers themselves (e.g., 4 bytes on 32-bit systems or 8 bytes on 64-bit systems). As shown in FIG. 7, the channel 0 of the input tensor 720 may be stored as a sparse representation 722. In another embodiment, the zero input values in the input tensor 720 may not be stored at all, and position information of the non-zero input value (e.g., {1, 2} in channel 0 of the input tensor 720) may be explicitly included in the index-value pair representation. In yet another embodiment, implicit position information may be determined if the PE keeps a counter during its iteration. In this case, assuming the PE starts the iteration from the position {0,0} of the 2-D input feature map in channel 1 with the counter set to 1, it will encounter the non-zero input value 3 at step 8. Based on the counter value and the size of the 2-D input feature map (the height and width are known), it may be determined the position of the non-zero input value as {1,2} in the 2-D input feature map in channel 1.

In some embodiments, the non-zero weights of a sub-filter group may be stored as index-value pairs by: identifying one or more non-zero weights in the sub-filter group; for each of the one or more non-zero weights: determining a channel identifier corresponding to a channel that the non-zero weight is located in; and storing the channel identifier and the non-zero weight as a second index-value pair. For example, the non-zero weight in the filter 740 may be represented as an index-value pair, with the index comprising the channel in which the non-zero weight is located (here, channel 0), and the value comprising the non-zero weight (here, 4). The index may be used when the PE looks for the kernel corresponding to a non-zero input value. When the index of the non-zero weight and the index of the non-zero input value match (meaning they are from the same channel), the corresponding kernel is found. In some embodiments, the index of an index-value pair for a non-zero weight may further comprise a kernel identifier. The kernel identifier indicates the kernel that the non-zero weight belongs to, and may be used to identify/locate the partial sum to which the product of the non-zero input value and the non-zero weight should be accumulated.

In some embodiments, the non-zero weights of a sub-filter group may be stored as index-value pairs by: identifying one or more non-zero weights in the sub-filter group; for each of the one or more non-zero weights: determining a channel identifier corresponding to a channel that the non-zero weight is located in; determining a kernel identifier corresponding to a kernel that the non-zero weight belongs to; and storing a pointer in a weight buffer header indexed by the channel identifier, the pointer pointing to a second index-value pair stored in a weight buffer array, wherein the second index-value pair comprises the non-zero weight and is indexed by the kernel identifier. That is, a non-zero weight may be indexed at two levels, where the first level is indexed according to the channel identifier and the second level is indexed according to the kernel identifier. In the example shown in FIG. 6C, the non-zero weights are first indexed in a weight buffer header based on channel identifiers, and the entries in the weight buffer header point to a weight buffer array where the actual non-zero weights are stored and indexed by the kernel identifiers. In some embodiments, the zero weights of the filter 740 may be stored as NULL pointers that consume no storage space except for a few bytes for the pointers themselves. As shown in FIG. 7, the channel 0 of filter k 740 (may also be called kernel 0) may be stored as a sparse representation 742, where the non-zero weight 4 is stored at position (0, 1), and other zero weights are stored as NULL pointers.

After the MAC operations performed on the input tensor 720 and the filter 740, the output tensor 760 may be determined. Since there is only one filter 740 in FIG. 7, the output tensor 760 only has 1 channel (the number of channels in the output tensor 760 is equal to the number of filters 740). Assuming the stride of the convolution processing is 1 without zero-padding, the non-zero input value 3 at position {1,2} in the sparse representation 722 and the non-zero weight 4 at position {0, 1} in the sparse representation 742 may produce a product of 12 that is placed at position {1, 1} in the output tensor 760. Similar to the sparse representations 722 and 742, the output tensor 760 may also be stored in a sparse representation 762 where only the non-zero values are stored as index-value pairs, and the zero values are stored as NULL pointers. In the example shown in FIG. 7, the sparse representation 762 representing the output tensor 760 may be obtained by performing convolutions on the sparse representation 722 of channel 0 in the input tensor 720 and the sparse representation 742 of channel 0 in the filter 740.

Figure 8A:
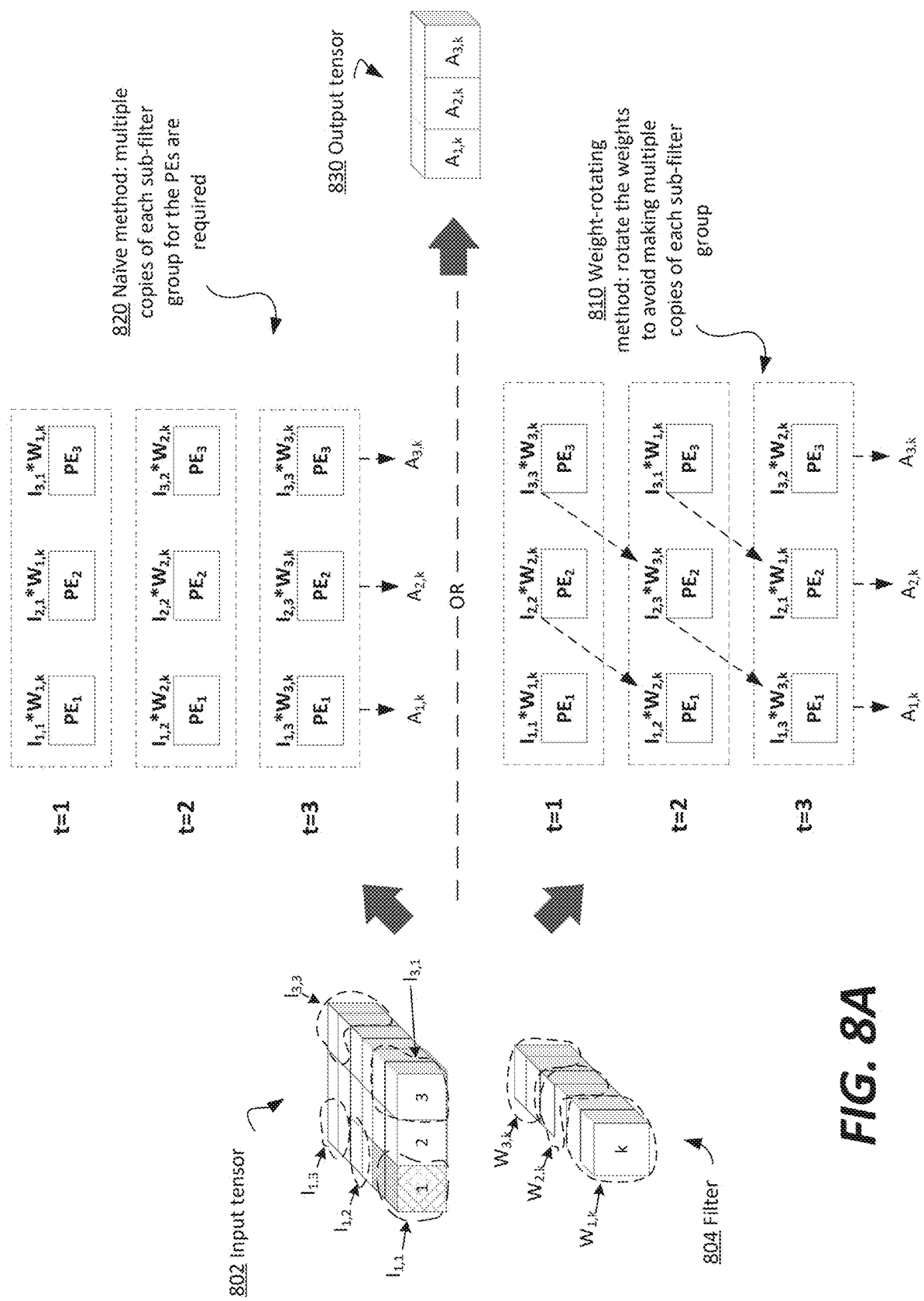
FIG. 8A illustrates an exemplary flow diagram for parallel convolution processing in accordance with various embodiments.

FIG. 8A illustrates an exemplary flow diagram for parallel convolution processing in accordance with various embodiments. As described above, a convolution computation may be parallelized in various ways. One exemplary parallelization configuration is described in FIG. 4, where the channel groups are processed sequentially, and for each channel group, the MAC operations are processed parallelly using a plurality of processing entities. The flow diagram in FIG. 8A illustrates a detailed process corresponding to the parallelization configuration described in FIG. 4.

As shown, the example input tensor 802 has a size of 1*3*6, with a height as 1, a width as 3, and a number of channels as 6. During segmentation, the 6 channels are divided into 3 channel groups, and the input tensor 802 is segmented along its height dimension, width dimension, and depth dimension (according to the channel groups) into a plurality of sub-tensors. As shown in FIG. 8A, each sub-tensor has a size of 1*1*2, with a height as 1, a width as 1, and a number of channels as 2. The input tensor 802 is segmented into 9 sub-tensors, and each sub-tensor may be denoted as $I_{x,y}$, where x refers to a position on the 2-D input feature map in the input tensor, and y refers to the channel group index. For example, $I_{1,1}$ refers to a sub-tensor at the position 1 of the 2-D input feature map (corresponding to {0,0} on the feature map) and in the first channel group, $I_{1,2}$ refers to a sub-tensor at the position 1 of the 2-D input feature map and in the second channel group, and $I_{3,3}$ refers to a sub-tensor at the position 3 of the 2-D input feature map (corresponding to {0,2} on the feature map) and in the third channel group.

For simplicity, only one filter 804 is shown in FIG. 8A, and has a size of 1*1*6. According to the channel segmentation for the input tensor 802, the filter 804 is segmented into three 1*1*2 sub-filters. Since there is just one filter 804 in this example, each of the sub-filters forms a sub-filter group denoted as $W_{y,k}$, where y refers to the channel group the sub-filter group belongs to, and k refers to the identifier of the filter 804 itself. For example, $W_{1,k}$ refers to the sub-filter group that is in the channel group 1 and belongs to the filter k (here, the filter 804).

After the input tensor 802 and the filter 804 are segmented, the sub-tensors and sub-filter groups are assigned to a plurality of PEs for multiple rounds of parallel processing. FIG. 8A illustrates two methods to assign the sub-tensors and sub-filter groups to the plurality of PEs: a naive method 820, and a weight-rotating method 810. In both methods, three PEs are used for each round of parallel processing, with each PE handling one of the three sub-tensors from the same channel group.

In the naive method 820, during the first round of parallel processing (t=1), $PE_1$, $PE_2$, and $PE_3$ handle the sub-tensors from the first channel group, and are assigned with $I_{1,1}*W_{1,k}$, $I_{2,1}*W_{1,k}$, and $I_{3,1}*W_{1,k}$ respectively. That is, the same sub-filter group $W_{1,k}$ is used by $PE_1$, $PE_2$, and $PE_3$ to generate MAC results. Here, "*" refers to MAC operations. During the second round of parallel processing (t=2), $PE_1$, $PE_2$, and $PE_3$ handle the sub-tensors from the second channel group, and are assigned with $I_{1,2}*W_{2,k}$, $I_{2,2}*W_{2,k}$, and $I_{3,2}*W_{2,k}$ respectively. That is, the same sub-filter group $W_{2,k}$ is used by $PE_1$, $PE_2$, and $PE_3$ to generate MAC results. Similarly, during the third round of parallel processing (t=3), $PE_1$, $PE_2$, and $PE_3$ handle the sub-tensors from the first channel group, and are assigned with $I_{1,3}*W_{3,k}$, $I_{2,3}*W_{3,k}$, and $I_{3,3}*W_{3,k}$ respectively. That is, the same sub-filter group $W_{3,k}$ is used by $PE_1$, $PE_2$, and $PE_3$ to generate MAC results. After the three rounds of parallel processing, the MAC results generated by $PE_1$ may be accumulated to generate the dot product $A_{1,k}$ (an activation for a next NN layer) of the first (left) 1*1*6 tensor of the input tensor 802 with the 1*1*6 filter 804. Similarly, the MAC results generated by $PE_2$ may be accumulated to generate the dot product $A_{2,k}$ of the second (middle) 1*1*6 tensor of the input tensor 802 with the 1*1*6 filter 804, and the MAC results generated by $PE_3$ may be accumulated to generate the dot product $A_{3,k}$ of the third (right) 1*1*6 tensor of the input tensor 802 with the 1*1*6 filter 804. These dot products may be subsequently assembled as the output tensor 830.

In some embodiments, the weight-rotating method 810 in FIG. 8A may comprise the following steps: conducting one or more iterations of a parallel process, each iteration comprising: determining a plurality of combinations of the sub-tensors and the sub-filter groups, wherein the plurality of combinations respectively correspond to the plurality of channel groups; and respectively feeding the plurality of combinations into a plurality of processors to generate a plurality of dot products. Here, the "one or more iterations" may be determined based on the number of channel groups (i.e., each channel group is handled by one iteration), and the plurality of processors may refer to the plurality of PEs 600 in FIGS. 5 and 6. In some embodiments, the "feeding the plurality of combinations into a plurality of processors" may follow a weight-rotating method, which rotates the weight assignment on the plurality of PEs for each iteration. The weight-rotating method may comprise following steps: during a first iteration of the one or more iterations, determining a first set of M combinations comprising an $i_{th}$ combination of a sub-tensor and a sub-filter group from an $i_{th}$ of the M channel groups, wherein 1<=i<=M; and during a second iteration of the one or more iterations, determining a second set of M combinations comprising the $i_{th}$ combination of a sub-tensor and a sub-filter group from an $(i+1)_{th}$ of the M channel groups, wherein 1<=i<M, and an $M_{th}$ combination of a sub-tensor and a sub-filter group from a 1st of the M channel groups.

As shown in FIG. 8A, during the first round of parallel processing (t=1) using the weight-rotating method 810, $PE_1$, $PE_2$, and $PE_3$ handle three sub-tensors from all three channel groups, and are assigned with $I_{1,1}*W_{1,k}$, $I_{2,2}*W_{2,k}$, and $I_{3,3}*W_{3,k}$ respectively. During the second round of parallel processing (t=2), the weights assigned to $PE_1$, $PE_2$, and $PE_3$ are rotated (left rotation in FIG. 8A). As shown in FIG. 8A, when t=2, the $PE_1$, $PE_2$, and $PE_3$ are assigned with $I_{1,2}*W_{2,k}$, $I_{2,3}*W_{3,k}$, and $I_{3,1}*W_{1,k}$ respectively. Similarly, when t=3, $PE_1$, $PE_2$, and $PE_3$ are assigned with $I_{1,3}*W_{3,k}$, $I_{2,1}*W_{1,k}$, and $I_{3,2}*W_{2,k}$ respectively. That is, one sub-filter group is assigned to $PE_x$ during the first round, and is rotated to $PE_{x-1}$ during the second round, and is further rotated to $PE_{x-2}$ during the third round. After the three rounds of parallel processing, the MAC results generated by each of $PE_1$, $PE_2$, and $PE_3$ may be accumulated to generate a dot product. These dot products may be subsequently assembled as the output tensor 830.

In a comparison of the naive method 820 and the weight-rotating method 810, the naive method 820 may require the same weights (i.e., the same sub-filter group) to be copied three times for the three PEs during each round of parallel processing, and after each round, the three PEs may need to fetch the next weight from memory of a higher level (e.g., from the off-chip DDR memory 520 in FIG. 5 or the I-cache 610 in FIG. 6A). Since the three rounds are sequentially processed, these weights are fetched sequentially from the higher level memory. Accessing data from a higher level memory is usually costly and slow. In contrast, the weight rotating method 810 may fetch all the three weights during the first round of parallel processing. This memory fetching step may be performed in parallel (e.g., each PE reads its assigned weights). For the following rounds, the weights are rotated among the PEs instead of being fetched from the higher level memory. Since rotating the weights among the PEs occurs within a lower-level memory system, it may yield faster speed and less energy cost. In some embodiments, the neighboring PEs may be connected by a direct channel to exchange cached data, which may further facilitate the weight rotation.

Figure 8B:
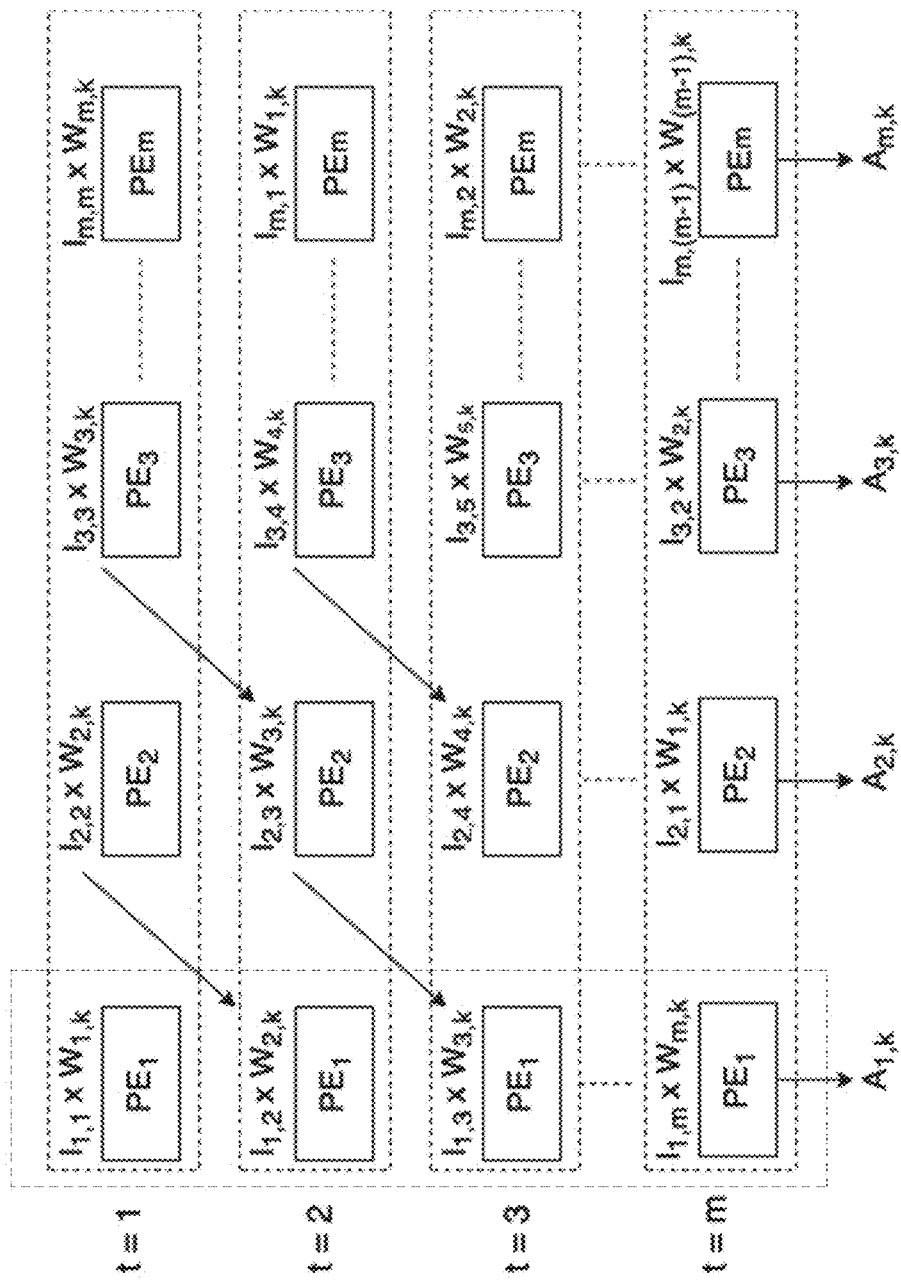
FIG. 8B illustrates another exemplary flow diagram for parallel convolution processing in accordance with various embodiments.

FIG. 8B illustrates another exemplary flow diagram for parallel convolution processing in accordance with various embodiments. The flow diagram in FIG. 8B is a generalized version of the weight-rotating method in FIG. 8A. The MAC operations to be performed in this example involve a batch of input tensors (comprising N input tensors) and a filter group, where each of the input tensors is segmented along its depth dimension and its height/width 2-D dimension, and the filter group is segmented along its depth dimension. The channels of each input tensor are segmented into a plurality of channel groups denoted as Gc (Groups of Channels, or the number of channel groups), with each Gc comprising Cg (Channels per Group) channels; and the 2-D input feature map of the input tensor is segmented into Gh*Gw (Groups of Height*Groups of Width) segments; the channels of the filter group is similarly segmented according to the plurality of channel groups Gc. Take the 3*3*6 input tensors 322 and 325 in FIG. 3 as an example, after the segmentation illustrated in FIG. 3, the 6 channels of the input tensor 322 are segmented into 3 groups (e.g., Gc is 3), and the 2-D input feature map of the input tensor 322 is segmented into 3*3 (e.g., Gh is 3, and Gw is 3) segments.

With the above denotations, the total number of summations to be generated by the MAC operations on the N input tensors and the filter group is B=N*Gh*Gw. Formally, the summations may be represented by the following formula:

$$\sum_{j=1}^{m} I_{ij} \otimes w_{jk} = A_{ik}, i = 1 \frac{m \quad m \quad m \quad m}{\cdots\cdots\cdots\cdots} B.$$

where m refers to Gc (number of channel groups), i refers to the $i_{th}$ summation of the B summations, j refers to the $j_{th}$ channel group in the m channel groups, k refers to the identifier of the filter group, I refers to a sub-tensor identified by i and j, w refers to a sub-filter group identified by j and k, A refers to a summation indexed by i and k (e.g., the activation that will be placed at position i in the 2-D feature map in channel k of the output tensor).

In some embodiments, the parallel convolution processing may start with dividing the B summations into a plurality of groups with each group comprising (generating) m summations. In order to generate m summations, m rounds of parallel processing may be performed. During each round of parallel processing, m PEs are used to compute m partial sums in parallel according to an assignment of m sub-tensors and m sub-filter groups to the m PEs. During two consecutive rounds of parallel processing, the m sub-filter groups may be rotated among the PEs. That is, during a first round, determining a first set of m combinations comprising an $i_{th}$, combination of a sub-tensor and a sub-filter group from an $i_{th}$, of the m channel groups, wherein 1<=i<=m; and during a second round, determining a second set of m combinations comprising the $i_{th}$, combination of a sub-tensor and a sub-filter group from an $(i+1)_{th}$, of the m channel groups, wherein 1<=i<m.

The diagram in FIG. 8B illustrates the multiple (m) rounds of parallel processing for one of the plurality of groups of summations. During the first round (t=1), each of the m PEs is assigned one sub-tensor and one sub-filter group from one channel group, but different PEs handle different channel groups (i.e., no two PEs handle the same channel group). As shown, when t=1, PE1 handles the first channel group ($I_{1,1}$ and $W_{1,k}$ are from channel group 1), and PE 2 handles the second channel group ($I_{2,2}$ and $W_{2,k}$ are from channel group 2). Furthermore, different PEs handle sub-tensors from different positions of a 2-D feature map of the input tensor, (i.e., no two PEs handle the sub-tensors from the same position on the 2-D feature map). As shown, when t=1, PE1 handles $I_{1,1}$ at position 1 on the 2-D feature map, and PE2 handles $I_{2,2}$ at position 2 on the 2-D feature map.

During the second round (t=2), the assignment of the sub-filter groups is rotated among the m PEs. For example, $W_{2,k}$ is rotated from PE2 (during the first round) to PE1 (during the second round). Formally, $W_{i,k}$ assigned to PEi during the $i_{th}$ round is rotated to PEi-1 during the $i+1_{th}$ round. For the following rounds (t=3, . . . , m), the weights are rotated in the same direction. It may be noted that the sub-filter group assigned to the first PE is rotated to the last PE.

After each round of the parallel processing, each PE may yield a partial sum by performing MAC operations on the assigned sub-tensor and sub-filter group. During the m rounds of parallel processing, the m partial sums generated by each PE may be accumulated to eventually generate a dot product (i.e., a summation to be assembled into an output tensor) after the m rounds are complete. As shown in FIG. 8B, the summation $A_{1,k}$ may be collected after PE1 accumulates the partial sums it generated during each round of parallel processing.

Figure 9:
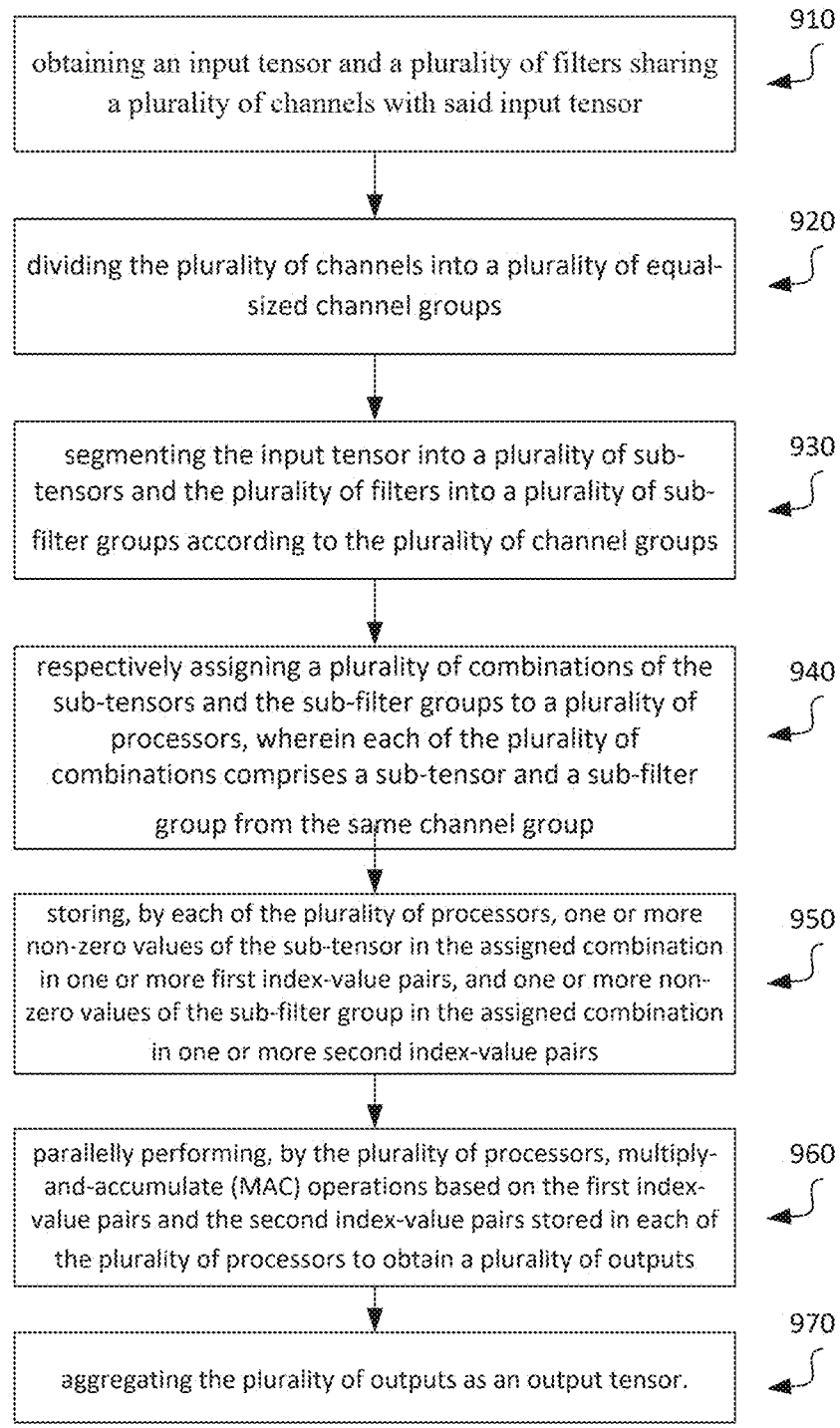
FIG. 9 illustrates an example method for parallelizing convolution processing in accordance with various embodiments.

FIG. 9 illustrates an example method for parallelizing convolution processing in accordance with various embodiments. The method 900 may be performed by a device, apparatus, or system for optimizing resource allocation. The method 900 may be performed by one or more modules/components of the environment or system illustrated by FIGS. 1-8, such as the hardware accelerator 500 in FIG. 5, the processing entity (PE) 600 in FIG. 6A, and the PE 6200 in FIG. 6C. The operations of the method 900 presented below are intended to be illustrative. Depending on the implementation, the method 900 may include additional, fewer, or alternative steps performed in various orders or in parallel.

Block 910 includes obtaining an input tensor and a plurality of filters sharing a plurality of channels with the input tensor.

Block 920 includes dividing the plurality of channels into a plurality of channel groups. In some embodiments, each of the plurality of channel groups comprises a same number of channels.

Block 930 includes segmenting the input tensor into a plurality of sub-tensors and the plurality of filters into a plurality of sub-filter groups according to the plurality of channel groups. In some embodiments, the segmenting the plurality of filters into a plurality of sub-filter groups comprises: grouping the plurality of filters into a plurality of filter groups; segmenting each of the plurality of filters into a plurality of sub-filters according to the plurality of channel groups; and determining the sub-filters of a same filter group and of a same channel group as a sub-filter group.

Block 940 includes respectively assigning a plurality of combinations of the sub-tensors and the sub-filter groups to a plurality of processors, wherein each of the plurality of combinations comprises a sub-tensor and a sub-filter group corresponding to the same channel group. In some embodiments, the respectively assigning a plurality of combinations of the sub-tensors and the sub-filter groups with a plurality of processors comprises: conducting one or more iterations of a parallel process, each iteration comprising: determining a plurality of combinations of the sub-tensors and the sub-filter groups, wherein the plurality of combinations respectively correspond to the plurality of channel groups; and respectively feeding the plurality of combinations into a plurality of processors to generate a plurality of dot products. In some embodiments, the plurality of channel groups comprise M channel groups, and the respectively feeding the plurality of combinations into the plurality of processors further comprises: during a first iteration of the one or more iterations, determining a first set of M combinations comprising an $i_{th}$, combination of a sub-tensor and a sub-filter group from an $i_{th}$, of the M channel groups, wherein $1<=i<=M$; and during a second iteration of the one or more iterations, determining a second set of M combinations comprising: the $i_{th}$, combination of a sub-tensor and a sub-filter group from an $(i+1)_{th}$, of the M channel groups, wherein $1<=i<M$, and an $M_{th}$, combination of a sub-tensor and a sub-filter group from a 1st of the M channel groups. In some embodiments, each processor of the plurality of processors generates one partial sum during each of the one or more iterations, and the aggregating the plurality of outputs as an output tensor comprises: for each processor of the plurality of processors, accumulating the partial sums generated by the processor across the one or more iterations to generate a dot product; and assembling the dot products generated by the plurality of processors across the one or more iterations as an output tensor.

Block 950 includes storing, by each of the plurality of processors, one or more non-zero values of the sub-tensor in the assigned combination in one or more first index-value pairs, and one or more non-zero values of the sub-filter group in the assigned combination in one or more second index-value pairs. In some embodiments, zero values of the sub-tensor and the sub-filter group in the assigned combination are not stored. In some embodiments, the storing one or more non-zero values of the sub-tensor in the assigned combination as one or more first index-value pairs comprises: identifying one or more non-zero input values in the sub-tensor; for each of the one or more non-zero input values: determining a channel identifier corresponding to a channel that the non-zero input value is located in; and storing the channel identifier and the non-zero input value as a first index-value pair. In some embodiments, the storing one or more non-zero values of the sub-filter group in the assigned combination as one or more second index-value pairs comprises: identifying one or more non-zero weights in the sub-filter group; for each of the one or more non-zero weights: determining a channel identifier corresponding to a channel that the non-zero weight is located in; and storing the channel identifier and the non-zero weight as a second index-value pair. In some embodiments, the storing one or more non-zero values of the sub-filter group in the assigned combination as one or more second index-value pairs comprises: identifying one or more non-zero weights in the sub-filter group; for each of the one or more non-zero weights: determining a channel identifier corresponding to a channel that the non-zero weight is located in; determining a kernel identifier corresponding to a kernel that the non-zero weight belongs to; and storing a pointer in a weight buffer header indexed by the channel identifier, the pointer pointing to a second index-value pair stored in a weight buffer array, wherein the second index-value pair comprises the non-zero weight and is indexed by the kernel identifier.

Block 960 includes parallelly performing, by the plurality of processors, multiply-and-accumulate (MAC) operations based on the first index-value pairs and the second index-value pairs to obtain a plurality of outputs. In some embodiments, the parallelly performing MAC operations on the plurality of combinations by the plurality of processors to obtain a plurality of outputs comprises, for each of the plurality of processors: obtaining a first index-value representation of a first non-zero value in the sub-tensor associated with the processor, wherein the first index-value representation comprises a first index corresponding to a first channel in which the first non-zero value is located; obtaining, based on the first index, a second index-value representation of a second non-zero value that is located in the first channel and is in a sub-filter of the sub-filter group associated with the processor, wherein the second index-value representation comprises a second index corresponding to a filter in which the sub-filter is located; performing MAC operations on the value of the first index-value representation and the value of the second index-value representation to obtain an output; and adding the output to a partial sum identified by the second index of the second index-value representation.

Block 970 includes aggregating the plurality of outputs as an output tensor.

In some embodiments, each of the plurality of channel groups comprises one or more of the plurality of sub-tensors, and each of the plurality of sub-tensors is associated with an identifier identifying a position of the sub-tensor within the channel group in which the sub-tensor is located, and the method 900 further comprises: storing sub-tensors associated with the same identifier from the plurality of channel groups into an input cache, wherein the input cache is shared by one or more of the plurality of processors.

In some embodiments, each of the plurality of channel groups comprises a same number of channels; and each of the plurality of sub-filter groups comprises a same number of sub-filters. In some embodiments, each of the sub-tensors and each of the sub-filters comprise the same number of channels.

Figure 10:
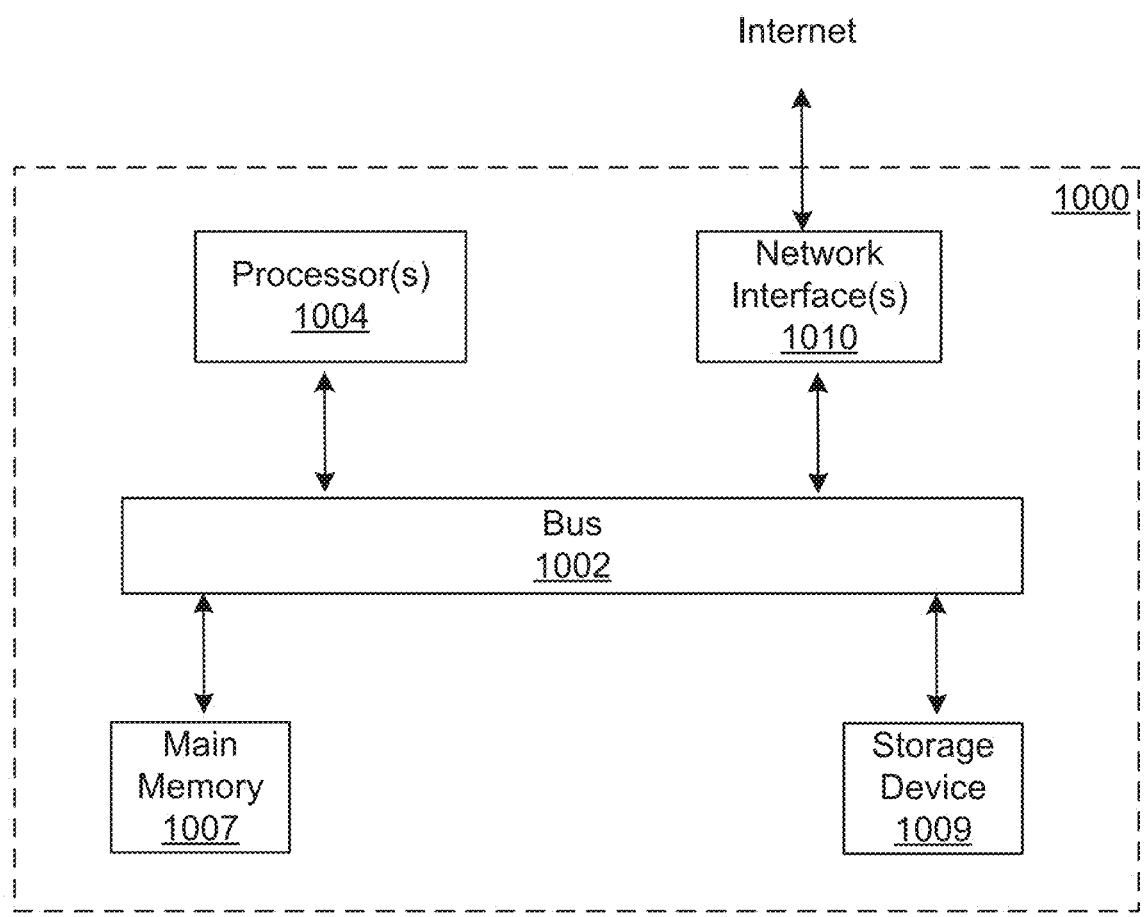
FIG. 10 illustrates an example computer system in which any of the embodiments described herein may be implemented.

FIG. 10 illustrates an example computing device in which any of the embodiments described herein may be implemented. The computing device may be used to implement one or more components of the systems and the methods shown in FIGS. 1-9 The computing device 1000 may comprise a bus 1002 or other communication mechanisms for communicating information and one or more hardware processors 1004 coupled with bus 1002 for processing information. Hardware processor(s) 1004 may be, for example, one or more general purpose microprocessors.

The computing device 1000 may also include a main memory 1007, such as a random-access memory (RAM), cache and/or other dynamic storage devices, coupled to bus 1002 for storing information and instructions to be executed by processor(s) 1004. Main memory 1007 also may be used for storing temporary variables or other intermediate information during execution of instructions to be executed by processor(s) 1004. Such instructions, when stored in storage media accessible to processor(s) 1004, may render computing device 1000 into a special-purpose machine that is customized to perform the operations specified in the instructions. Main memory 1007 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 1000 may implement the techniques described herein using customized hard-wired logic, one or more ASICs or FPGAs, firmware and/or program logic which in combination with the computing device may cause or program computing device 1000 to be a special-purpose machine. According to one embodiment, the techniques herein are performed by computing device 1000 in response to processor(s) 1004 executing one or more sequences of one or more instructions contained in main memory 1007. Such instructions may be read into main memory 1007 from another storage medium, such as storage device 1009. Execution of the sequences of instructions contained in main memory 1007 may cause processor(s) 1004 to perform the process steps described herein. For example, the processes/methods disclosed herein may be implemented by computer program instructions stored in main memory 1007. When these instructions are executed by processor(s) 1004, they may perform the steps as shown in corresponding figures and described above. In alternative embodiments, hard-wired circuitry may be used in place of or in combination with software instructions.

The computing device 1000 also includes a communication interface 1010 coupled to bus 1002. Communication interface 1010 may provide a two-way data communication coupling to one or more network links that are connected to one or more networks. As another example, communication interface 1010 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer-readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method, comprising:
   obtaining an input tensor and a plurality of filters sharing a plurality of channels with the input tensor;
   dividing the plurality of channels into a plurality of channel groups;
   segmenting the input tensor into a plurality of sub-tensors and the plurality of filters into a plurality of sub-filter groups according to the plurality of channel groups;
   respectively assigning a plurality of combinations of the sub-tensors and the sub-filter groups to a plurality of processors, wherein each of the plurality of combinations comprises a sub-tensor and a sub-filter group corresponding to the same channel group;
   storing, by each of the plurality of processors, one or more non-zero values of the sub-tensor in the assigned combination in one or more first index-value pairs, and one or more non-zero values of the sub-filter group in the assigned combination in one or more second index-value pairs;

parallelly performing, by the plurality of processors, multiply-and-accumulate (MAC) operations based on the first index-value pairs and the second index-value pairs to obtain a plurality of outputs; and aggregating the plurality of outputs as an output tensor.

2. The method of claim 1, wherein the segmenting the plurality of filters into a plurality of sub-filter groups comprises:

grouping the plurality of filters into a plurality of filter groups;

segmenting each of the plurality of filters into a plurality of sub-filters according to the plurality of channel groups; and determining the sub-filters of a same filter group and of a same channel group as a sub-filter group.

3. The method of claim 1, wherein each of the plurality of channel groups comprises one or more of the plurality of sub-tensors, and each of the plurality of sub-tensors is associated with an identifier identifying a position of the sub-tensor within the channel group in which the sub-tensor is located, and the method further comprises:

storing sub-tensors associated with the same identifier from the plurality of channel groups into an input cache, wherein the input cache is shared by one or more of the plurality of processors.

4. The method of claim 1, wherein zero values of the sub-tensor and the sub-filter group in the assigned combination are not stored.

5. The method of claim 1, wherein the storing one or more non-zero values of the sub-tensor in the assigned combination as one or more first index-value pairs comprises:

identifying one or more non-zero input values in the sub-tensor;

for each of the one or more non-zero input values:
  determining a channel identifier corresponding to a channel that the non-zero input value is located in; and
  storing the channel identifier and the non-zero input value as a first index-value pair.

6. The method of claim 1, wherein the storing one or more non-zero values of the sub-filter group in the assigned combination as one or more second index-value pairs comprises:

identifying one or more non-zero weights in the sub-filter group;

for each of the one or more non-zero weights:
  determining a channel identifier corresponding to a channel that the non-zero weight is located in; and
  storing the channel identifier and the non-zero weight as a second index-value pair.

7. The method of claim 1, wherein the storing one or more non-zero values of the sub-filter group in the assigned combination as one or more second index-value pairs comprises:

identifying one or more non-zero weights in the sub-filter group;

for each of the one or more non-zero weights:
  determining a channel identifier corresponding to a channel that the non-zero weight is located in;
  determining a kernel identifier corresponding to a kernel that the non-zero weight belongs to; and storing a pointer in a weight buffer header indexed by the channel identifier, the pointer pointing to a second index-value pair stored in a weight buffer array, wherein the second index-value pair comprises the non-zero weight and is indexed by the kernel identifier.

8. The method of claim 1, wherein the respectively assigning a plurality of combinations of the sub-tensors and the sub-filter groups with a plurality of processors comprises:

conducting one or more iterations of a parallel process, each iteration comprising:
  determining a plurality of combinations of the sub-tensors and the sub-filter groups, wherein the plurality of combinations respectively correspond to the plurality of channel groups; and
  respectively feeding the plurality of combinations into a plurality of processors to generate a plurality of dot products.

9. The method of claim 8, wherein the plurality of channel groups comprise M channel groups, and the respectively feeding the plurality of combinations into the plurality of processors further comprises:
  during a first iteration of the one or more iterations, determining a first set of M combinations comprising an $i_{th}$ combination of a sub-tensor and a sub-filter group from an $i_{th}$ of the M channel groups, wherein 1<=i<=M; and
  during a second iteration of the one or more iterations, determining a second set of M combinations comprising:
    the $i_{th}$ combination of a sub-tensor and a sub-filter group from an $(i+1)_{th}$ of the M channel groups, wherein 1<=i<M, and
    an $M_{th}$ combination of a sub-tensor and a sub-filter group from a 1st of the M channel groups.

10. The method of claim 8, wherein each processor of the plurality of processors generates one partial sum during each of the one or more iterations, and the aggregating the plurality of outputs as an output tensor comprises:
  for each processor of the plurality of processors, accumulating the partial sums generated by the processor across the one or more iterations to generate a dot product; and
  assembling the dot products generated by the plurality of processors across the one or more iterations as an output tensor.

11. The method of claim 1, wherein the parallelly performing MAC operations on the plurality of combinations by the plurality of processors to obtain a plurality of outputs comprises, for each of the plurality of processors:

obtaining a first index-value representation of a first non-zero value in the sub-tensor associated with the processor, wherein the first index-value representation comprises a first index corresponding to a first channel in which the first non-zero value is located;

obtaining, based on the first index, a second index-value representation of a second non-zero value that is located in the first channel and is in a sub-filter of the sub-filter group associated with the processor, wherein the second index-value representation comprises a second index corresponding to a filter in which the sub-filter is located;

performing MAC operations on the value of the first index-value representation and the value of the second index-value representation to obtain an output; and adding the output to a partial sum identified by the second index of the second index-value representation.

12. The method of claim 1, wherein each of the plurality of channel groups comprises a same number of channels; and each of the plurality of sub-filter groups comprises a same number of sub-filters.

13. The method of claim 12, wherein each of the sub-tensors and each of the sub-filters comprise the same number of channels.

14. A system for parallelizing convolution processing, comprising one or more processors and one or more non-transitory computer-readable memories coupled to the one or more processors and configured with instructions executable by the one or more processors to cause the system to perform operations comprising:
    obtaining an input tensor and a plurality of filters sharing a plurality of channels with the input tensor;
    dividing the plurality of channels into a plurality of channel groups;
    segmenting the input tensor into a plurality of sub-tensors and the plurality of filters into a plurality of sub-filter groups according to the plurality of channel groups;
    respectively assigning a plurality of combinations of the sub-tensors and the sub-filter groups to a plurality of processors, wherein each of the plurality of combinations comprises a sub-tensor and a sub-filter group corresponding to the same channel group;
    storing, by each of the plurality of processors, one or more non-zero values of the sub-tensor in the assigned combination in one or more first index-value pairs, and one or more non-zero values of the sub-filter group in the assigned combination in one or more second index-value pairs;
    parallelly performing, by the plurality of processors, multiply-and-accumulate (MAC) operations based on the first index-value pairs and the second index-value pairs stored in each of the plurality of processors to obtain a plurality of outputs; and
    aggregating the plurality of outputs as an output tensor.

15. The system of claim 14, wherein the segmenting the plurality of filters into a plurality of sub-filter groups comprises:
    grouping the plurality of filters into a plurality of filter groups;
    segmenting each of the plurality of filters into a plurality of sub-filters according to the plurality of channel groups; and
    determining the sub-filters of a same filter group and of a same channel group as a sub-filter group.

16. The system of claim 14, wherein the storing one or more non-zero values of the sub-tensor in the assigned combination as one or more first index-value pairs comprises:
    identifying one or more non-zero input values in the sub-tensor;
    for each of the one or more non-zero input values:
        determining a channel identifier corresponding to a channel that the non-zero input value is located in; and
        storing the channel identifier and the non-zero input value as a first index-value pair.

17. The system of claim 14, wherein the storing one or more non-zero values of the sub-filter group in the assigned combination as one or more second index-value pairs comprises:
    identifying one or more non-zero weights in the sub-filter group;
    for each of the one or more non-zero weights:
        determining a channel identifier corresponding to a channel that the non-zero weight is located in;
        determining a kernel identifier corresponding to a kernel that the non-zero weight belongs to; and storing a pointer in a weight buffer header indexed by the channel identifier, the pointer pointing to a second index-value pair stored in a weight buffer array, wherein the second index-value pair comprises the non-zero weight and is indexed by the kernel identifier.

18. The system of claim 14, wherein the respectively assigning a plurality of combinations of the sub-tensors and the sub-filter groups with a plurality of processors comprises:
    conducting one or more iterations of a parallel process, each iteration comprising:
        determining a plurality of combinations of the sub-tensors and the sub-filter groups, wherein the plurality of combinations respectively correspond to the plurality of channel groups; and
        respectively feeding the plurality of combinations into a plurality of processors to generate a plurality of dot products.

19. A non-transitory computer-readable storage medium for parallelizing convolution processing, configured with instructions executable by one or more processors to cause the one or more processors to perform operations comprising:
    obtaining an input tensor and a plurality of filters sharing a plurality of channels with the input tensor;
    dividing the plurality of channels into a plurality of channel groups;
    segmenting the input tensor into a plurality of sub-tensors and the plurality of filters into a plurality of sub-filter groups according to the plurality of channel groups;
    respectively assigning a plurality of combinations of the sub-tensors and the sub-filter groups to a plurality of processors, wherein each of the plurality of combinations comprises a sub-tensor and a sub-filter group corresponding to the same channel group;
    storing, by each of the plurality of processors, one or more non-zero values of the sub-tensor in the assigned combination in one or more first index-value pairs, and one or more non-zero values of the sub-filter group in the assigned combination in one or more second index-value pairs;
    parallelly performing, by the plurality of processors, multiply-and-accumulate (MAC) operations based on the first index-value pairs and the second index-value pairs stored in each of the plurality of processors to obtain a plurality of outputs; and
    aggregating the plurality of outputs as an output tensor.

20. The storage medium of claim 19, wherein the storing one or more non-zero values of the sub-filter group in the assigned combination as one or more second index-value pairs comprises:
    identifying one or more non-zero weights in the sub-filter group;
    for each of the one or more non-zero weights:
        determining a channel identifier corresponding to a channel that the non-zero weight is located in;
        determining a kernel identifier corresponding to a kernel that the non-zero weight belongs to; and storing a pointer in a weight buffer header indexed by the channel identifier, the pointer pointing to a second index-value pair stored in a weight buffer array, wherein the second index-value pair comprises the non-zero weight and is indexed by the kernel identifier.

* * * * *